(12) United States Patent
Seo et al.

(10) Patent No.: US 12,465,024 B1
(45) Date of Patent: Nov. 11, 2025

(54) TECHNIQUE FOR CALCULATING THE BACKFAT THICKNESS OF A SOW

(71) Applicant: M3SEN Co., Ltd., Seoul (KR)

(72) Inventors: Man Hyeong Seo, Bucheon-si (KR); Hee Kwang Lee, Hwaseong-si (KR)

(73) Assignee: M3SEN Co., Ltd., Seoul (KR)

( * ) Notice: Subject to any disclaimer, the term of this patent is extended or adjusted under 35 U.S.C. 154(b) by 0 days.

(21) Appl. No.: 19/264,628

(22) Filed: Jul. 9, 2025

(30) Foreign Application Priority Data

Aug. 26, 2024 (KR) .................. 10-2024-0114366

(51) Int. Cl.
| | |
|---|---|
| *A01K 29/00* | (2006.01) |
| *G01S 15/89* | (2006.01) |
| *G06T 7/50* | (2017.01) |
| *G06T 7/90* | (2017.01) |
| *G06V 10/56* | (2022.01) |
| *G06V 40/10* | (2022.01) |

(52) U.S. Cl.
CPC ........ *A01K 29/002* (2025.08); *G01S 15/8993* (2013.01); *G06T 7/50* (2017.01); *G06T 7/90* (2017.01); *G06V 10/56* (2022.01); *G06V 40/10* (2022.01); *G06T 2207/10028* (2013.01); *G06T 2207/10136* (2013.01); *G06T 2207/20081* (2013.01)

(58) Field of Classification Search
CPC ..... A01K 29/002; G01S 15/8993; G06T 7/50; G06T 7/90; G06T 2207/10028; G06T 2207/10136; G06T 2207/20081; G06V 10/56; G06V 40/10
See application file for complete search history.

(56) References Cited

U.S. PATENT DOCUMENTS

| | | | |
|---|---|---|---|
| 2005/0136819 | A1 | 6/2005 | Kriesel |
| 2025/0225671 | A1* | 7/2025 | Martello ................. G06T 7/62 |

FOREIGN PATENT DOCUMENTS

| | | |
|---|---|---|
| KR | 10-1431757 | 6/2014 |
| KR | 10-2307327 | 10/2020 |
| KR | 10-2021-0126953 | 10/2021 |
| KR | 10-2537863 | 5/2022 |
| KR | 10-2595842 | 10/2023 |
| KR | 10-2782847 | 10/2023 |
| KR | 10-2023-0160642 | 11/2023 |

OTHER PUBLICATIONS

Ivan Roy S., "YOLOv7 and DeepSORT for Intelligent Quail Behavioral Activities Monitoring" (Year: 2022).*

(Continued)

*Primary Examiner* — Dhaval V Patel
(74) *Attorney, Agent, or Firm* — Fish IP Law, LLP

(57) ABSTRACT

According to some embodiments of the present disclosure, a method for calculating a backfat thickness of a sow by a processor of a device is disclosed. The method may comprise: recognizing a dorsal angle measurement region using frame data; recognizing a plurality of three-dimensional coordinate values related to at least three points within the dorsal angle measurement region; and calculating a dorsal angle value of the sow for calculating the backfat thickness of the sow using the plurality of three-dimensional coordinate values.

13 Claims, 17 Drawing Sheets

(56) References Cited

OTHER PUBLICATIONS

Body Weight Estimation for Pigs Based on 3D Hybrid Filter and Convolutional Neural Network , by Zihao Liu (Year: 2023).*

"Deep learning pose detection model for sow locomotion" by Tauana Maria CarlosGuimarães de Paula1 (Year: 2024).*

Depth video data-enabled predictions of longitudinal dairy cow body weight using thresholding and Mask R-CNN algorithms Ye Bi (Year: 2023).*

* cited by examiner

TECHNIQUE FOR CALCULATING THE BACKFAT THICKNESS OF A SOW

This application claims benefit and priority of Korean patent application No. 10-2024-0114366 filed Aug. 26, 2024, which is incorporated herein by reference.

BACKGROUND

1. Technical Field

The present disclosure relates to a technique for calculating the backfat thickness of a sow, and more specifically, to a device and method for recognizing a dorsal angle measurement region using frame data, recognizing a plurality of three-dimensional coordinate values related to at least three points within the dorsal angle measurement region, and calculating a dorsal angle value of the sow using the plurality of three-dimensional coordinate values to calculate the backfat thickness value of the sow.

2. Related Art

In the field of livestock farming, especially in environments where pigs are raised, it is important to measure a pig's body weight, body shape, body temperature, backfat thickness, and body condition score (BCS). This is because the measurement results determine the amount of feed to be given to the pig and whether the pig is ill. Also, in order to ensure productivity in pig farming, it is important to obtain the measurement results. Therefore, various measurement methods and measuring devices are used in the field of livestock farming. However, most of the conventional measurement methods and measuring devices require a worker to perform the measurement manually.

Since the worker relies on visual observation or palpation to measure body weight, body shape, body temperature, backfat thickness, and body condition score of pigs, it is problematic in that it requires a great amount of labor and time for the worker to frequently monitor a large number of sows—more than hundreds—at short intervals.

In addition, due to aging populations in rural areas and a decreasing workforce, the level of skilled labor in the domestic livestock industry is on the decline. Therefore, when a worker manually measures the body weight, body shape, body temperature, backfat thickness, and body condition score of pigs, it may cause a decrease in work efficiency and productivity.

Accordingly, there is an urgent need to develop a technology that can achieve both productivity improvement and labor reduction.

SUMMARY

The present disclosure is intended to solve the aforementioned problems and other issues.

The technical problem to be solved by some embodiments of the present disclosure is to calculate the backfat thickness of a sow using a non-contact method.

The technical problems to be solved in the present disclosure are not limited to those mentioned above, and other technical problems not mentioned will be clearly understood by those skilled in the art from the description below.

A method for calculating the backfat thickness of a sow by a processor of a device according to some embodiments of the present disclosure may comprise: recognizing a dorsal angle measurement region using frame data; recognizing a plurality of three-dimensional coordinate values related to at least three points within the dorsal angle measurement region; and calculating a dorsal angle value of the sow for calculating the backfat thickness value of the sow using the plurality of three-dimensional coordinate values.

According to some embodiments of the present disclosure, the frame data may include color information acquired through a color sensor included in the scanning device and depth information acquired through a depth sensor included in the scanning device.

According to some embodiments of the present disclosure, the dorsal angle measurement region may include a first vertex, a second vertex, a third vertex, and a fourth vertex, wherein a first center point located at the center of an imaginary line connecting the first vertex and the second vertex is located at a position spaced a first distance from a starting point of the tail of the sow, and a second center point located at the center of an imaginary line connecting the third vertex and the fourth vertex is located at a position spaced a second distance, which is shorter than the first distance, from the starting point of the tail of the sow.

According to some embodiments of the present disclosure, the dorsal angle measurement region may include a position estimated to be where a last rib of the sow is located.

According to some embodiments of the present disclosure, the recognizing the dorsal angle measurement region using the frame data may comprise: inputting at least one of the frame data and body data acquired based on the frame data into a dorsal angle measurement region detection model; and recognizing the dorsal angle measurement region based on dorsal angle measurement region information output from the dorsal angle measurement region detection model.

According to some embodiments of the present disclosure, the at least three points may comprise: a first point estimated to be where the spine of the sow is located, a second point spaced a preset distance in a first direction from the first point, and a third point spaced the preset distance in a second direction opposite to the first direction from the first point.

According to some embodiments of the present disclosure, the recognizing a plurality of three-dimensional coordinate values related to at least three points within the dorsal angle measurement region may comprise: recognizing an arbitrary point located on a central line within the dorsal angle measurement region as the first point; recognizing the second point spaced the preset distance from the first point in the first direction and the third point spaced the preset distance from the first point in a second direction opposite to the first direction; and recognizing the three-dimensional coordinate values related to the first point, the second point, and the third point as the plurality of three-dimensional coordinate values.

According to some embodiments of the present disclosure, the preset distance may be shorter than the vertical length and horizontal length of the dorsal angle measurement region.

According to some embodiments of the present disclosure, the body data may include at least one of: tail position information of the sow, chest width information of the sow, rump width information of the sow, and body length information of the sow.

According to some embodiments of the present disclosure, the first distance and the second distance may be determined based on the body length information of the sow.

According to some embodiments of the present disclosure, the method may further comprise calculating the backfat thickness value by inputting the dorsal angle value into a backfat thickness calculation formula, wherein the backfat thickness calculation formula may be generated using a plurality of dorsal angle values obtained by measuring a plurality of dorsal angle measurement points of each of a plurality of external sows using a dorsal angle measurer, and a plurality of backfat thickness values measured by contacting an ultrasound device to any one of the dorsal angle measurement points of each of the plurality of external sows.

According to some embodiments of the present disclosure, the body data may be acquired by inputting the frame data into a body data acquisition model for the sow.

According to some embodiments of the present disclosure, the method may further comprise a step of determining a body condition score of the sow using the backfat thickness value when the backfat thickness value is calculated.

According to some embodiments of the present disclosure, a computer program stored in a computer-readable storage medium according to some embodiments of the present disclosure, when executed by a processor of a device, performs steps for calculating the backfat thickness of a sow, and the steps comprise: recognizing a dorsal angle measurement region using frame data; recognizing a plurality of three-dimensional coordinate values related to at least three points within the dorsal angle measurement region; and calculating a dorsal angle value of the sow for calculating the backfat thickness of the sow using the plurality of three-dimensional coordinate values.

According to some embodiments of the present disclosure, a device for calculating the backfat thickness of a sow according to some embodiments of the present disclosure comprises: a storage configured to store at least one program instruction; and a processor configured to execute the at least one program instruction, wherein the processor performs steps for calculating the backfat thickness of the sow, the steps comprising: recognizing a dorsal angle measurement region using frame data; recognizing a plurality of three-dimensional coordinate values related to at least three points within the dorsal angle measurement region; and calculating a dorsal angle value of the sow for calculating the backfat thickness of the sow using the plurality of three-dimensional coordinate values.

The technical means that can be obtained from the present disclosure are not limited to those mentioned above, and other technical means not mentioned will be clearly understood by those skilled in the art from the description below.

The effects of the technique for calculating the backfat thickness of a sow according to the present disclosure are as follows.

According to some embodiments of the present disclosure, since the backfat thickness of a sow can be calculated using a non-contact method, stress on the sow can be minimized, thereby improving the quality of colostrum and reducing the rates of stillbirth and dystocia.

The effects that can be obtained through the present disclosure are not limited to the effects mentioned above, and other effects not mentioned will be clearly understood by those skilled in the art from the description below.

BRIEF DESCRIPTION OF THE DRAWINGS

Various embodiments of the present disclosure are described with reference to the drawings, in which similar reference numbers are collectively used to refer to similar components. In the following embodiments, for the purpose of explanation, many specific details are provided to give a comprehensive understanding of one or more embodiments. However, it will be apparent that such embodiments may be implemented without these specific details.

DETAILED DESCRIPTION

Figure 1:
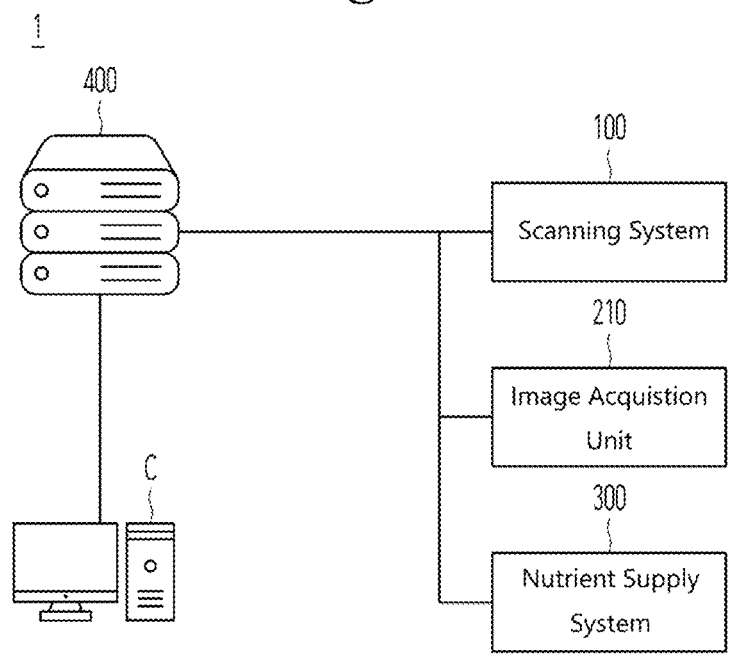
FIG. 1 is a diagram for explaining an example of an automatic sow management system according to some embodiments of the present disclosure.

Hereinafter, various embodiments of the device according to the present disclosure and a control method of the device will be described in detail with reference to the drawings. The same or similar components are assigned the same reference numbers regardless of the figure number, and redundant descriptions thereof will be omitted.

The objectives and effects of the present disclosure, as well as the technical configurations for achieving them, will become clear by referring to the embodiments described in detail below together with the attached drawings. In describing one or more embodiments of the present disclosure, detailed descriptions of well-known related technologies may be omitted when it is determined that they would obscure the gist of at least one embodiment of the present disclosure.

The terms used in the present disclosure are defined in consideration of the functions of the present disclosure, and may vary depending on the intention or practice of the user or operator. Also, the attached drawings are merely provided to facilitate understanding of one or more embodiments of the present disclosure, and the technical spirit of the present disclosure is not limited by the attached drawings, but should be understood to include all modifications, equivalents, and substitutions that fall within the scope and spirit of the invention.

Suffixes such as "module" and "unit" used in the following descriptions of components are assigned or used interchangeably only for ease of drafting the present disclosure, and do not have mutually distinguishing meanings or functions by themselves.

Terms including ordinal numbers such as "first" and "second" may be used to describe various components, but the components are not limited by those terms. These terms are used only to distinguish one component from another. For example, a first component may be referred to as a second component within the technical scope of the present disclosure.

When a component is referred to as being "connected" or "coupled" to another component, it may be directly connected or coupled to the other component, or another component may be interposed therebetween. On the other hand, when a component is referred to as being "directly connected" or "directly coupled" to another component, it should be understood that there is no other component interposed therebetween.

The singular forms used in the present disclosure include the plural forms unless the context clearly indicates otherwise. That is, unless specifically stated or clearly indicated by the context, the singular form shall be interpreted as meaning "one or more."

As used in the present disclosure, the terms "comprise," "comprising," "include," "including," or "have," "having," and the like are intended to specify the presence of stated features, numbers, steps, operations, components, parts, or combinations thereof, but do not preclude the presence or addition of one or more other features, numbers, steps, operations, components, parts, or combinations thereof.

The term "or" used in the present disclosure is intended to be inclusive, not exclusive. That is, unless specified otherwise or clearly indicated by context, the expression "X uses A or B" is intended to mean any of the natural inclusive interpretations. For example, it may mean that X uses A, or X uses B, or X uses both A and B. In addition, the expression "and/or" used in the present disclosure is intended to mean all possible combinations of one or more of the listed items.

The terms "information" and "data" used in the present disclosure may be used interchangeably.

Unless otherwise defined, all terms (including technical and scientific terms) used in the present disclosure have the same meanings as commonly understood by one of ordinary skill in the art to which the present disclosure belongs. Terms generally defined in commonly used dictionaries should be interpreted as having meanings consistent with their meanings in the relevant technical field and should not be interpreted in an excessively broad or overly narrow sense unless otherwise defined.

However, the present disclosure is not limited to the embodiments disclosed below, but may be embodied in various different forms. The embodiments are provided to fully convey the scope of the present disclosure to those skilled in the art, and the present disclosure is defined only by the scope of the claims. Therefore, the definitions should be made based on the overall content of the present disclosure.

According to some embodiments of the present disclosure, the device may recognize body condition information of a sow by analyzing data acquired from the scanning system. Here, the body condition information of the sow may include at least one of: a body condition score (BCS) of the sow, a backfat thickness value of the sow, and a body weight of the sow. This will be described in detail below with reference to FIGS. 9 to 14.

Meanwhile, according to some embodiments of the present disclosure, the device may calibrate a backfat thickness calculation formula for calculating a backfat thickness value of a sow. This will be described in detail with reference to FIG. 15.

In the following FIGS. 1 to 17, for convenience of explanation, the embodiments are described limited to matters related to sows, but the embodiments described in FIGS. 1 to 17 may also be applied to livestock other than sows (for example, cattle, etc.).

Figure 2:
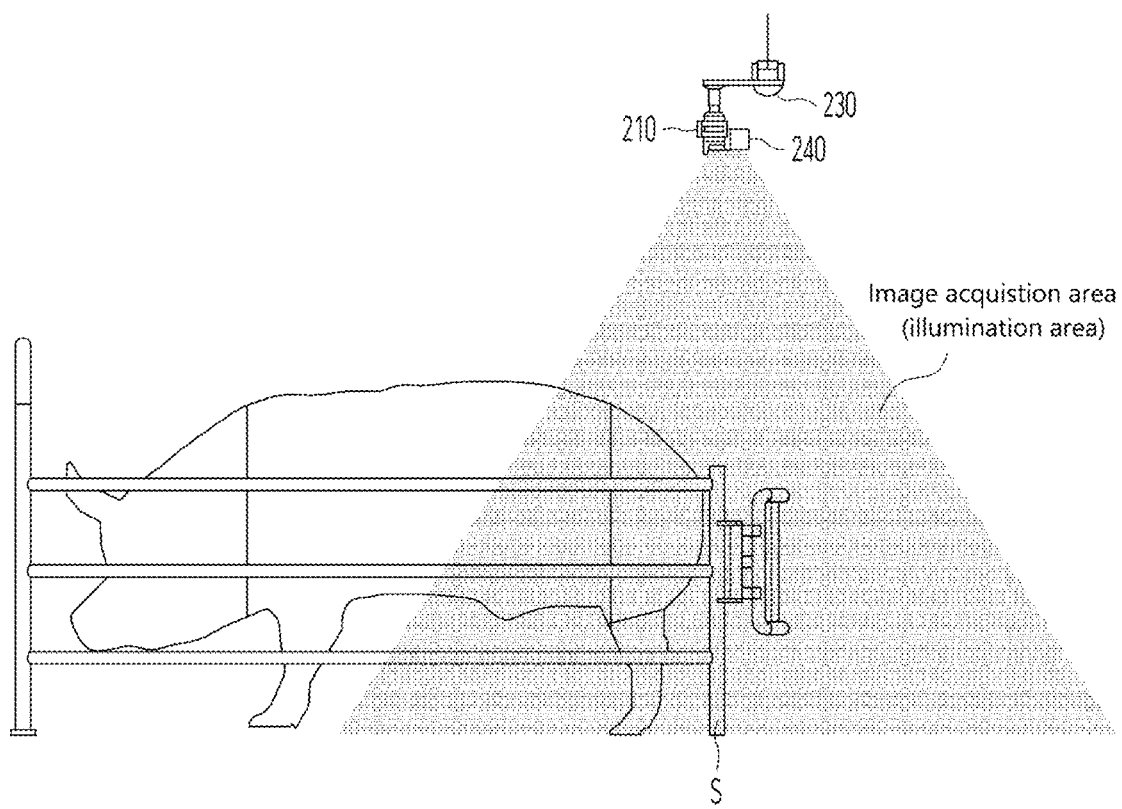
FIG. 2 is a diagram for explaining an example of an image acquisition unit according to some embodiments of the present disclosure.
Figure 3:
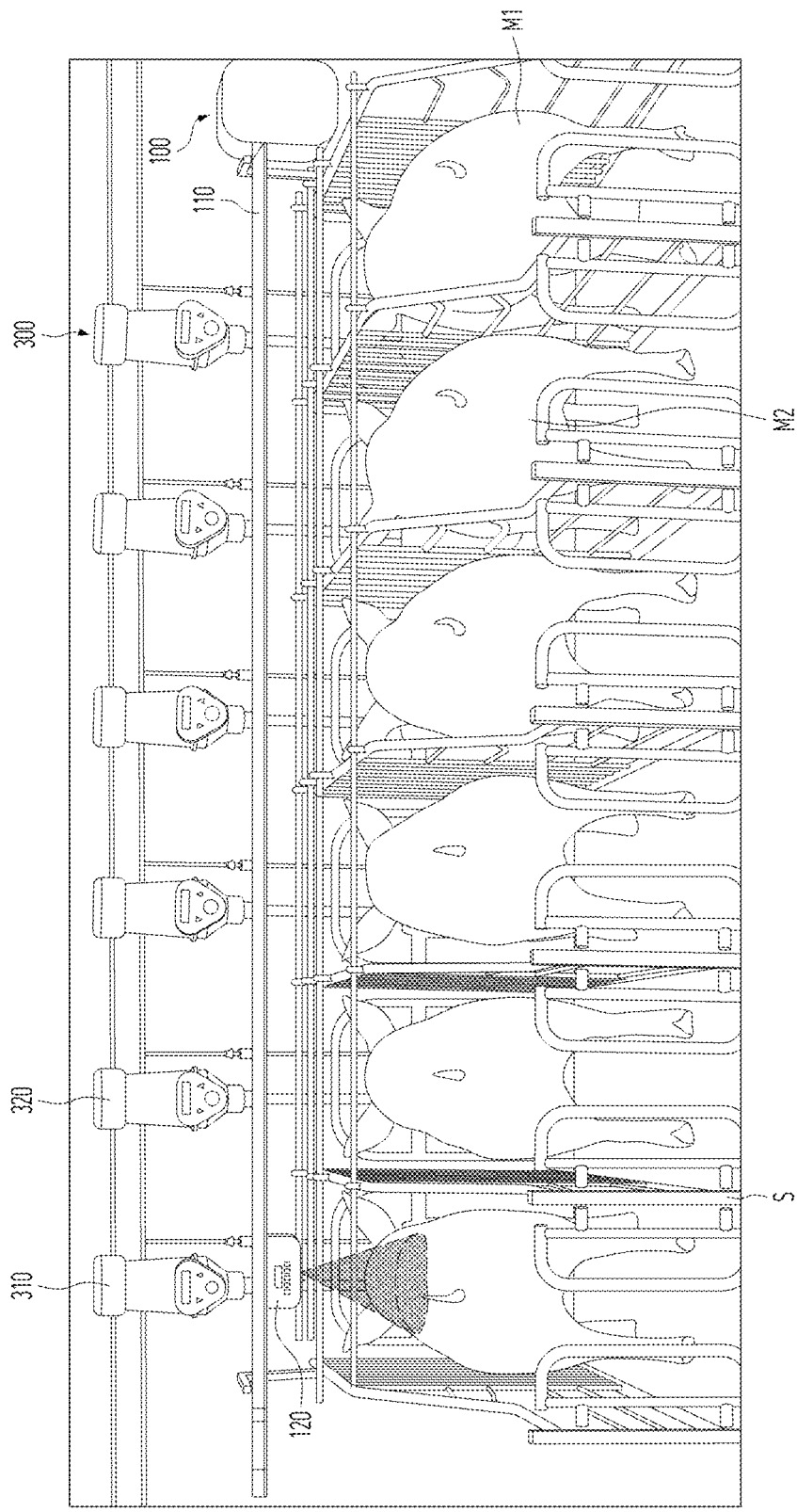
FIG. 3 is a diagram for explaining an example of a scanning system and a nutrient supply system according to some embodiments of the present disclosure.

FIG. 1 is a diagram for explaining an example of an automatic sow management system according to some embodiments of the present disclosure. FIG. 2 is a diagram for explaining an example of an image acquisition unit according to some embodiments of the present disclosure. FIG. 3 is a diagram for explaining an example of a scanning system and a nutrient supply system according to some embodiments of the present disclosure.

Referring to FIG. 1, an automatic sow management system 1 may include a scanning system 100, an image acquisition unit 210, a nutrient supply system 300, a device 400, and a client device C. The components constituting the automatic sow management system 1 shown in FIG. 1 are not essential for implementing the automatic sow management system 1, and the automatic sow management system 1 described in the present disclosure may have more or fewer components than those listed above.

In the present disclosure, an automatic sow management system 1 may provide various types of information related to the sow to the user and may automatically supply an appropriate amount of nutrients to the sow. However, the present disclosure is not limited thereto, and the automatic sow management system 1 may perform various tasks related to the sow.

According to some embodiments of the present disclosure, a device 400 may be a digital device or system that receives data from a scanning system 100 and an image acquisition unit 210, and supplies data to or receives data from a nutrient supply system 300 and a client device C. Here, the device 400 may refer to a server. For example, the device 400 may be a service server provided by a manufacturer, and may provide a web page, web content, or web service. However, the present disclosure is not limited thereto.

In the present disclosure, a device 400 refers to a server, but depending on the context, it may refer to a computer system, a computer device, a fixed device, or a mobile device, and unless specifically stated otherwise, it may be used to include all of them.

In the present disclosure, a scanning system 100 may acquire a plurality of frame data. Here, the plurality of frame data may include at least one of: color information acquired through a color sensor, depth information acquired through a depth sensor, and body temperature information of the sow acquired through a temperature sensor. However, the present disclosure is not limited thereto.

In the present disclosure, color information and depth information acquired through the scanning system 100 may be combined to generate three-dimensional image data, and three-dimensional video data may be generated using this. Two-dimensional image data may be generated using the color information acquired through the scanning system 100, and two-dimensional video data may be generated using this. Thermal image data may be generated using a temperature sensor acquired through the scanning system 100, and thermal video data may be generated using this. However, the present disclosure is not limited thereto.

The device 400 may perform tasks such as recognizing body condition information of each of a plurality of sows by analyzing a plurality of frame data received from the scanning system 100, or recognizing a sow with an abnormal condition among the plurality of sows. Here, the body condition information of the sow may include at least one of: a body condition score of the sow, a backfat thickness value of the sow, and a body weight of the sow. However, the present disclosure is not limited thereto.

According to some embodiments of the present disclosure, a plurality of image frame data acquired through an image acquisition unit 210 may be transmitted to the device 400 via an external device. Here, the external device may refer to a device installed in the pigpen separately from the device 400, and the external device may receive the plurality of image frame data from the image acquisition unit 210 and transmit it to the device 400. However, the present disclosure is not limited thereto, and the image acquisition unit 210 may also directly transmit the plurality of image frame data to the device 400 without passing through the external device.

In the present disclosure, two-dimensional video data may be generated using a plurality of image frame data acquired through an image acquisition unit 210. However, the present disclosure is not limited thereto.

The device 400 may recognize whether a plurality of events have occurred by analyzing a plurality of image frame data acquired from the image acquisition unit 210. Here, the plurality of events may include a farrowing event of the sow and a standing event of the sow. The farrowing event may be an event indicating that the sow has completed the delivery of newborn piglets, and the standing event may be an event indicating that the sow has stood up. However, the present disclosure is not limited thereto.

In the present disclosure, the device 400 may determine a nutrient supply amount to be provided to the sow. Specifically, the device 400 may determine the nutrient supply amount by analyzing a plurality of frame data acquired from the scanning system 100 and image frame data acquired from the image acquisition unit 210. In this case, the device 400 may transmit information on the nutrient supply amount to the nutrient supply system 300, thereby causing the nutrient supply system 300 to supply nutrients according to the nutrient supply amount. Here, the nutrient supply amount may vary depending on the current state of the sow (for example, pregnancy state, lactation state, etc.), and the current state of the sow may be determined by the device 400 by analyzing a plurality of image frame data acquired from the scanning system 100 and the image acquisition unit 210. However, the present disclosure is not limited thereto.

The device 400 may provide a web page that allows confirmation of videos in which a plurality of sows are captured and the analysis results of the videos. Here, the video in which a plurality of sows are captured may be at least one video generated using a plurality of frame data received from the scanning system 100 and/or a plurality of image frame data received from the image acquisition unit 210.

A user may access a specific URL using a client device C, log in on the web page, and check videos related to the sows in the pigpen and the analysis results of the videos.

The video displayed on the web page may be a video generated based on data being acquired in real time through the scanning system 100 and/or the image acquisition unit 210. However, the present disclosure is not limited thereto.

According to some embodiments of the present disclosure, the plurality of frame data acquired through the scanning system 100 may be frame data that includes multiple sows. However, the image frame data acquired through the image acquisition unit 210 may be frame data that includes a single sow. That is, a video generated using the plurality of frame data acquired through the scanning system 100 may include multiple sows, and a video generated using the image frame data acquired through the image acquisition unit 210 may include a single sow.

Although only one image acquisition unit 210 is shown in FIGS. 1 and 2, a plurality of image acquisition units 210 may be installed in the pigpen, and image frame data acquired through the plurality of image acquisition units 210 may be transmitted to the device 400. In this case, each of the plurality of image acquisition units 210 may be arranged to capture different sows.

Referring to FIG. 2, a sow may be located at a specific position by a crate S to prevent crushing of piglets, and the image acquisition unit 210 may be positioned above the specific location where the sow is placed so as to capture at least a portion of the sow. Here, at least a portion of the sow may refer to the lower body of the sow. In this case, the image frame data acquired through the image acquisition unit 210 may include at least one of the sow's tail, uterus, and hips. However, the present disclosure is not limited thereto.

In the present disclosure, the image acquisition unit 210 may include a lighting device 240. The lighting device 240 may irradiate visible light onto the image acquisition area where the image frame data is acquired through the image acquisition unit 210. Since the lighting device 240 uses visible light rather than infrared light, the image acquisition unit 210 may acquire clearer image frame data of the sow.

Meanwhile, the visible light irradiated by the lighting device 240 may disturb the sow's sleep at night. To prevent this, as shown in FIG. 2, the installation positions of the image acquisition unit 210 and the lighting device 240 may be adjusted and determined so that the visible light is irradiated only onto the lower body of the sow.

Meanwhile, a status indicator 230 may be located together with the image acquisition unit 210 and the lighting device 240 at the installed position. The status indicator 230 may visually indicate the farrowing status and colostrum status of the sow. The status indicator 230 may include indicator lights of various colors, and each color may indicate various types of events such as whether farrowing has started, whether the farrowing interval has exceeded a predetermined time, whether a predetermined time has elapsed since the start of the first farrowing (whether colostrum is within its valid period), or whether there is a problem in the environment around the sow. A user may enter the pigpen and check the color of the status indicator 230 to more easily manage each of the plurality of sows.

In the present disclosure, the device 400 may cause a status indicator 230, which is installed at the location where the sow related to the image frame data is positioned, to display a color corresponding to the analysis result based on the analysis result of the image frame data.

Referring to FIG. 3, a crate S for preventing piglet crushing may form a plurality of spaces so that each of a plurality of sows can be accommodated. Accordingly, each of the plurality of spaces formed by the crate S may be occupied by a respective one of the plurality of sows. That is, one sow may be placed in each of the plurality of spaces formed by the crate S.

The scanning system 100 may acquire a plurality of frame data through a scanning device 120 that moves along a rail 110. Here, the rail 110 is installed in the direction in which a plurality of sows are arranged, so that the scanning device 120 can move along the direction in which the plurality of sows are arranged. Accordingly, the scanning device 120 may move along the rail 110 and capture a plurality of sows present in the pigpen to acquire a plurality of frame data.

In the present disclosure, the rail 110 may be installed at a certain height from the floor, crossing each of the plurality of spaces formed by the crate S. The rail 110 may be implemented using various metallic materials such as stainless steel or aluminum.

Stainless steel has strong durability against ammonia gas, but its high cost and heavy weight may make it difficult to apply in practice. In addition, although aluminum is inexpensive and lightweight, it may be difficult to use because it is easily corroded by ammonia gas in the pigpen. Therefore, to solve these problems, the rail 110 may be implemented using a plastic material.

The scanning device 120 may be installed to be movable along the rail 110. The scanning device 120 may include a plurality of sensors (for example, a color sensor, a depth sensor, and a temperature sensor). The scanning device 120 may acquire biological information such as images and/or body temperature of sows located in each of the plurality of spaces formed by the crate S through the plurality of sensors.

The nutrient supply system 300 may include a plurality of nutrient supply devices positioned to supply nutrients to each of the plurality of sows located in each of the plurality of spaces formed by the crate S. Specifically, the nutrient supply system 300 may include a first nutrient supply device 310 for supplying nutrients to a first sow M1 and a second nutrient supply device 320 for supplying nutrients to a second sow M2. The nutrient supply amounts provided by the first nutrient supply device 310 and the second nutrient supply device 320 may be determined by the device 400, and the nutrient supply amount provided by the first nutrient supply device 310 may differ from that provided by the second nutrient supply device 320. However, the present disclosure is not limited thereto.

In the present disclosure, the description has been limited to the first sow M1 and the second sow M2, but the present disclosure is not limited thereto. If the number of sows increases, the number of nutrient supply devices may also increase. That is, one nutrient supply device may be assigned to each of the plurality of sows.

Referring back to FIG. 1, a client device C is a device used by a user outside the pigpen to check the internal status of the pigpen, and may include a desktop computer, a digital TV, a laptop computer, a mobile phone, a smart phone, or a tablet PC.

A user may access a specific URL using a client device C and log in on the web page. Then, the user can easily check the situation inside the pigpen using the client device C.

In one example, when the user logs in, a video in which a plurality of sows in the pigpen are shown sequentially, along with the analysis results of the video, may be displayed on the web page. Here, the video may be generated using a plurality of frame data acquired through the scanning system 100, and the analysis results of the video may be generated by analyzing the plurality of frame data.

In another example, when the user logs in, a video related to at least one sow in the pigpen may be displayed in real time on the web page, and the analysis results of the video may also be displayed. Here, the video may be generated using image frame data acquired through the image acquisition unit 210, and the analysis results of the video may be generated by analyzing the image frame data.

According to some embodiments of the present disclosure, the device 400 may transmit a message via a preset messenger program to notify the user that a specific event has occurred. In this case, the user may check the message received through the preset messenger program using the client device C to recognize that a specific event has occurred, and may access the web page provided by the device 400 to view a video generated using the image frame data acquired from the image acquisition unit 210. Accordingly, when a specific event occurs in the pigpen, the user can easily check the internal situation of the pigpen from outside.

Figure 4:
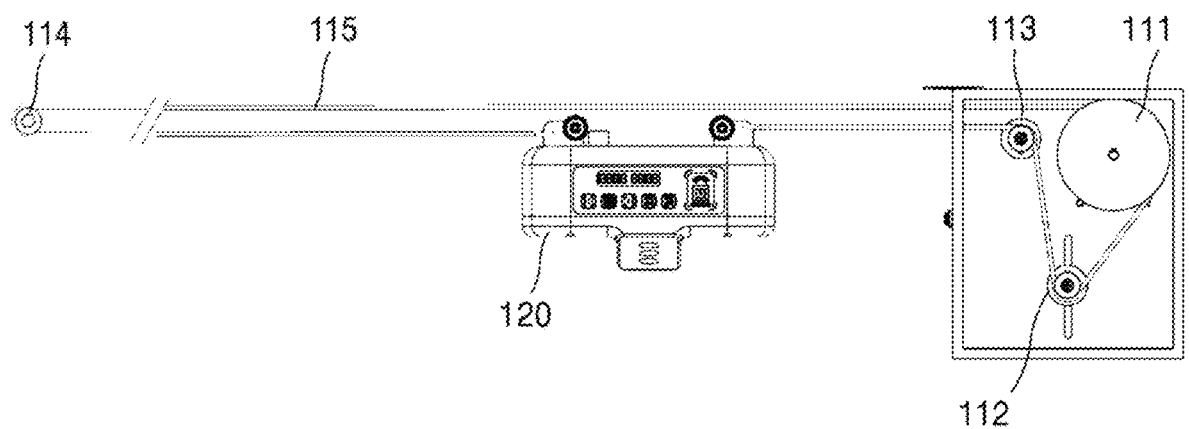
FIG. 4 is a diagram for explaining an example of a configuration for driving a scanning system according to some embodiments of the present disclosure.
Figure 5:
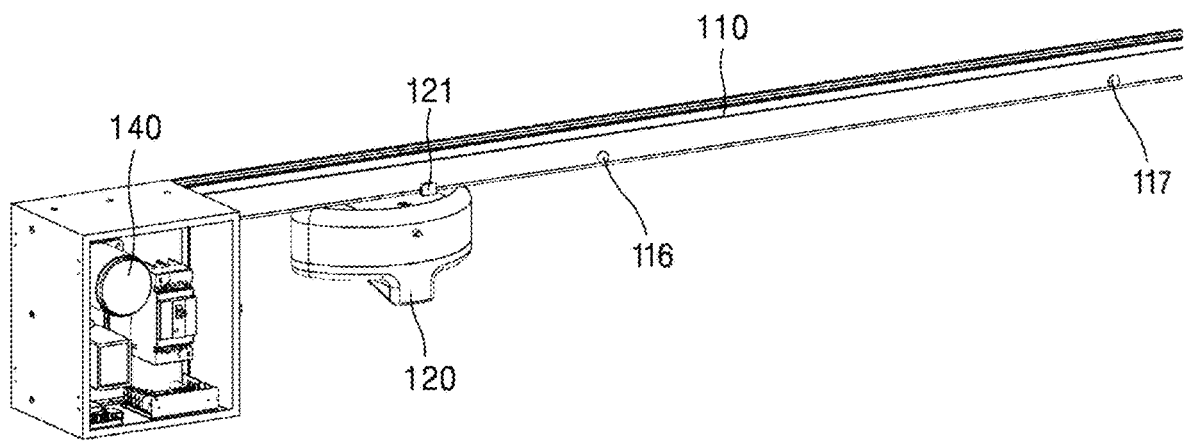
FIG. 5 is a diagram for explaining an example of a configuration for controlling the position of a scanning device in a scanning system according to some embodiments of the present disclosure.

FIG. 4 is a diagram for explaining an example of a configuration for driving a scanning system according to some embodiments of the present disclosure. FIG. 5 is a diagram for explaining an example of a configuration for controlling the position of a scanning device in the scanning system according to some embodiments of the present disclosure. With respect to FIGS. 4 and 5, overlapping content already described in relation to FIGS. 1 to 3 will not be repeated, and the following description will focus on the differences.

Referring to FIGS. 4 and 5, pulleys 111, 112, 113, and 114 may be positioned at both ends of the rail 110. A wire 130 may be connected to both ends of the scanning device 120 while passing through at least one pulley (a first pulley 111, a second pulley 112, and a third pulley 113) located at one end of the rail 110, a fourth pulley 114 located at the other end of the rail 110, and a drive unit 140. The number and shape of the pulleys 111, 112, 113, and 114 positioned at both ends of the rail 110 may vary.

The drive unit 140 may pull the wire 130 connected to both sides of the scanning device 120 to the left or right, thereby moving the scanning device 120. Specifically, the direction in which the scanning device 120 moves along the rail 110 may vary depending on the rotation direction (for example, clockwise or counterclockwise) of the drive unit 140.

For example, when the drive unit 140 rotates clockwise, the scanning device 120 may move to the left along the rail 110, and when the drive unit 140 rotates counterclockwise, the scanning device 120 may move to the right along the rail 110.

The above example is merely one example, and the present disclosure is not limited thereto.

Referring to FIG. 5, at least one magnetic component 116 or 117 may be present on the rail 110. The at least one magnetic component 116 or 117 may be located at positions where each of the plurality of sows is located, or may be located at predefined positions on the rail 110. However, the present disclosure is not limited thereto.

In the present disclosure, a magnetic detection sensor 121 may refer to a Hall sensor. However, the present disclosure is not limited thereto.

Figure 6:
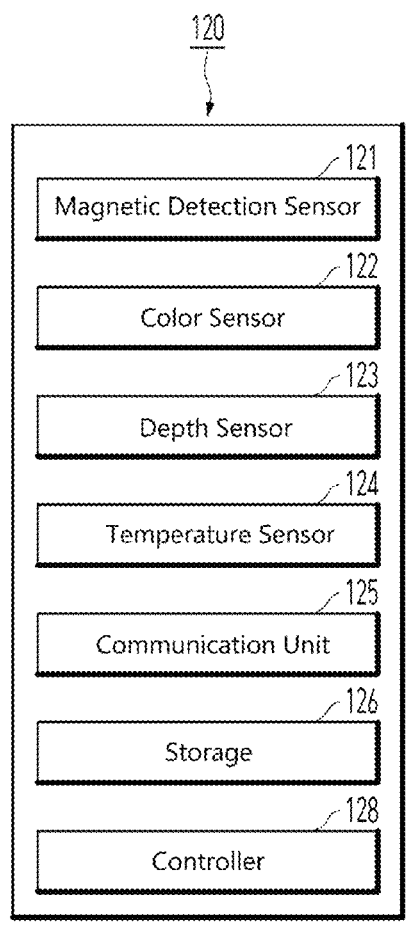
FIG. 6 is a block diagram of a scanning device according to some embodiments of the present disclosure.
Figure 7:
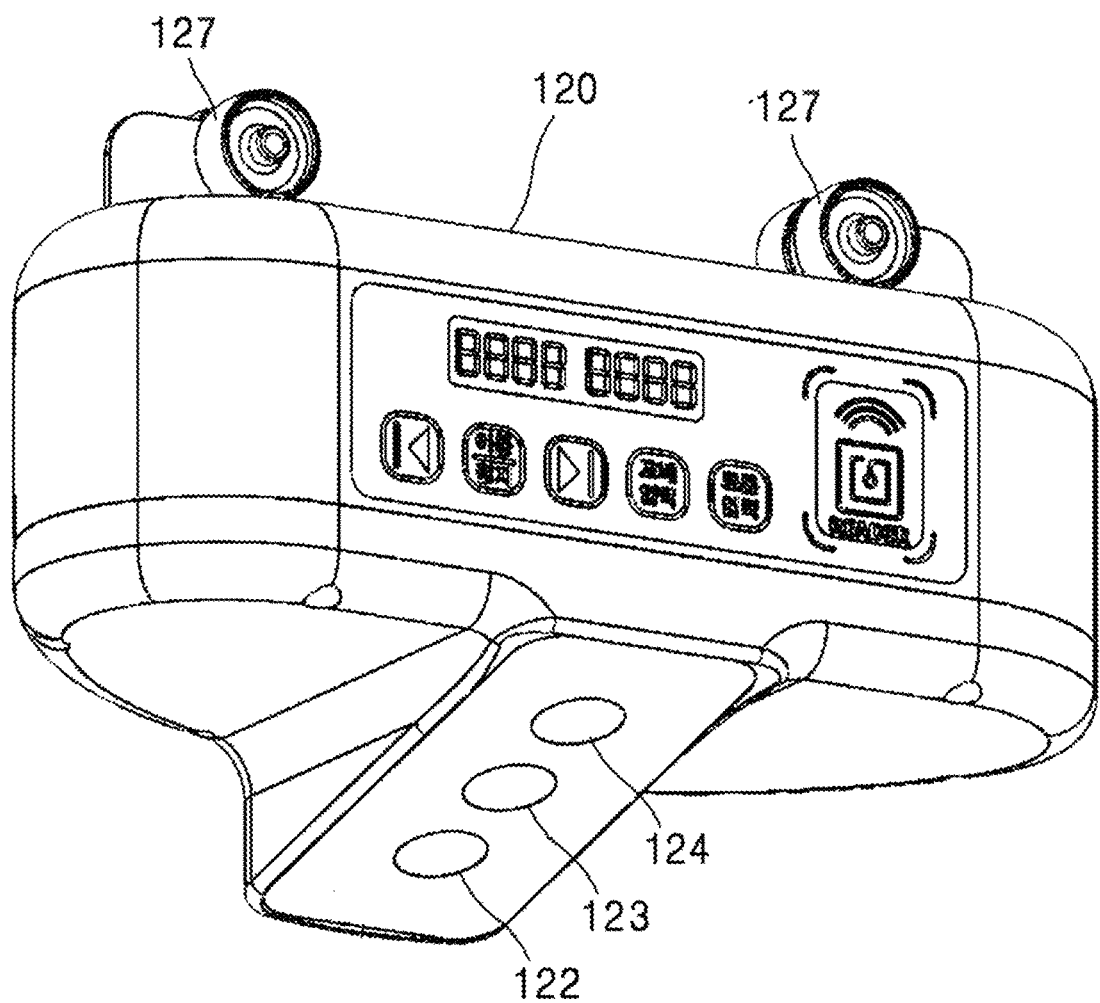
FIG. 7 is a diagram for explaining an example of a scanning device according to some embodiments of the present disclosure.

FIG. 6 is a block diagram of a scanning device according to some embodiments of the present disclosure. FIG. 7 is a diagram for explaining an example of the scanning device according to some embodiments of the present disclosure. Descriptions that overlap with those related to FIGS. 1 to 5 will not be repeated with respect to FIGS. 6 and 7.

Referring to FIG. 6, the scanning device 120 may include a magnetic detection sensor 121, a color sensor 122, a depth sensor 123, a temperature sensor 124, a communication unit 125, a storage 126, and a controller 128. However, the components shown in FIG. 6 are not essential for implementing the scanning device 120, and the scanning device 120 described in the present disclosure may include more or fewer components than those listed above.

The magnetic detection sensor 121 may detect the presence and strength of a magnetic field by measuring voltage changes induced by the magnetic field. Here, the magnetic field may be formed by at least one magnetic component 116 or 117 placed on the rail 110.

When the scanning device 120 moves along the rail 110, the magnetic detection sensor 121 may detect the at least one magnetic component 116 or 117 on the rail 110, and this may be used for recognizing position information. The scanning device 120 may transmit the position information along with the frame data to the device 400. However, the present disclosure is not limited thereto, and the scanning device 120 may also transmit only the frame data to the device 400.

Referring again to FIG. 6, the color sensor 122 may detect optical signals coming from the outside and extract color information from the signals. The color sensor 122 may mainly include an optical sensing element composed of multiple pixels. However, the present disclosure is not limited thereto.

Specifically, the color sensor 122 may separate external light into specific wavelength bands using a color filter array placed on each pixel, and generate color information such as RGB (Red, Green, Blue) based on the wavelength information that reaches each individual pixel.

The color information generated by the color sensor 122 may be converted into digital image data. When only the color information is used, two-dimensional color images may be generated. Meanwhile, the color information may be combined with depth information provided by the depth sensor 123 to generate color images in three-dimensional space.

The depth sensor 123 may refer to a sensor that measures the distance to a target. The depth sensor 123 may utilize principles such as Time-of-Flight (ToF), structured light, or stereo vision.

For example, the depth sensor 123 may emit a signal (e.g., infrared) from a light source, reflect it off the target, and calculate the time it takes for the reflected signal to return to the depth sensor 123, or analyze a deformed pattern caused by the reflection on the target's surface to calculate the distance to the target. However, the present disclosure is not limited thereto.

In the present disclosure, the depth information acquired through the depth sensor 123 may be combined with the color information acquired from the color sensor to generate three-dimensional image data that includes the position and color of the target in 3D space.

In the present disclosure, the plurality of frame data acquired from the scanning device 120 may include color information obtained from the color sensor 122 and depth information obtained from the depth sensor 123, and may be used to generate two-dimensional and/or three-dimensional video.

In the present disclosure, each of the plurality of frame data may represent a single image or a three-dimensional image including color and depth information at a specific point in time. Therefore, the plurality of frame data may be recorded continuously or generated in real time, forming video over time.

The color information included in each of the plurality of frame data may be composed of the color information of each pixel collected from the color sensor 122 at the time each frame is generated, and may be expressed as RGB values. The color information may be structured in the form of a two-dimensional array of the frame, and each pixel may represent the color value at that point. However, the present disclosure is not limited thereto.

The depth information may be composed of the depth information of each pixel collected from the depth sensor 123 when each of the plurality of frame data is generated. The depth information may include depth values corresponding to each pixel of each of the plurality of frame data, and these values may indicate the positions of the corresponding pixels in actual three-dimensional space.

The temperature sensor 124 may acquire temperature information by measuring the body temperature of each of the plurality of sows present in the pigpen.

According to some embodiments of the present disclosure, the temperature sensor 124 may calculate the temperature of a sow by detecting infrared radiation emitted from the sow. Here, the temperature sensor 124 may be an infrared sensor or a thermal imaging camera. However, the present disclosure is not limited thereto.

Referring to FIG. 7, the color sensor 122, the depth sensor 123, and the temperature sensor 124 included in the scanning device 120 may be disposed on an inclined portion positioned at the lower part of the scanning device. Here, the inclined portion may have an appropriate tilt so that the plurality of sows in the pigpen can be sensed by the color sensor 122, the depth sensor 123, and the temperature sensor 124 as the scanning device 120 moves along the rail 110.

Meanwhile, the scanning device 120 may include at least one wheel unit 127 to minimize friction when moving along the rail 110.

Referring again to FIG. 6, the communication unit 125 may include one or more modules that enable wired/wireless communication between the scanning device 120 and the device 400.

According to some embodiments of the present disclosure, the communication unit 125 may transmit information acquired through the color sensor 122, the depth sensor 123, and the temperature sensor 124 of the scanning device 120 to the device 400. However, the present disclosure is not limited thereto.

The storage 126 may store data supporting various functions of the scanning device 120. The storage 126 may store data, commands, and at least one program instruction for the operation of the scanning device 120.

The storage 126 may include at least one type of storage medium selected from a flash memory type, a hard disk type, a solid state disk (SSD) type, a silicon disk drive (SDD) type, a multimedia card micro type, a card-type memory (for example, SD or XD memory), RAM (random access memory), SRAM (static random access memory), ROM (read-only memory), EEPROM (electrically erasable programmable read-only memory), PROM (programmable read-only memory), magnetic memory, magnetic disk, and optical disk.

In the present disclosure, the storage 126 may store a sow body data acquisition model, a target object identification model, a posture suitability determination model, a dorsal angle measurement region detection model, and a spine line validity determination model, which will be described later with reference to FIGS. 9 to 16. In this case, the controller 128 may perform the operations described later in FIGS. 9 to 16 by using each of the sow body data acquisition model, the target object identification model, the posture suitability determination model, the dorsal angle measurement region detection model, and the spine line validity determination model stored in the storage 126.

The controller 128 typically controls the overall operation of the scanning device 120. The controller 128 may process signals, data, and information input or output through the components described above, or execute programs stored in the storage 126.

Meanwhile, the scanning device 120 may be operated solely by an internal battery (not shown) without receiving power directly from an external source. In this case, the battery may be charged in various ways. However, the present disclosure is not limited thereto, and the scanning device 120 may also receive power directly from an external source.

Figure 8:
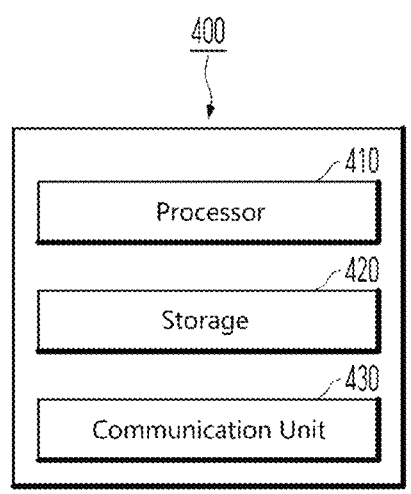
FIG. 8 is a block diagram of a device according to some embodiments of the present disclosure.

FIG. 8 is a block diagram of a device according to some embodiments of the present disclosure. Descriptions that overlap with those in FIGS. 1 to 7 will not be repeated with respect to FIG. 8.

Referring to FIG. 8, the device 400 may include a processor 410, a storage 420, and a communication unit 430. The components shown in FIG. 8 are not essential for implementing the device 400, and the device 400 described in the present disclosure may include more or fewer components than those listed above.

Each component of the device 400 in the present disclosure may be integrated, added, or omitted depending on the specifications of the actually implemented device 400. That is, if necessary, two or more components may be combined into a single component, or a single component may be divided into two or more components. In addition, the functions performed in each block are for explaining the embodiments of the present disclosure, and the specific operations or devices do not limit the scope of rights of the present invention.

The communication unit 430 may include one or more modules that enable wired/wireless communication between the device 400 and a wired/wireless communication system, between the device 400 and a client device C, between the device 400 and the image acquisition unit 210, between the device 400 and the nutrient supply system 300, or between the device 400 and the scanning system 100. The communication unit 430 may also include one or more modules that connect the device 400 to one or more networks.

The communication unit 430 refers to a module for wired/wireless internet access and may be built into or externally connected to the device 400. The communication unit 430 may be configured to transmit and receive wired/wireless signals.

The communication unit 430 may transmit and receive wireless signals with at least one of a base station, an external device 200, and a client device C over a mobile communication network established according to communication standards or methods for mobile communication (e.g., GSM (Global System for Mobile communication), CDMA (Code Division Multiple Access), CDMA2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

Wireless internet technologies may include, for example, WLAN (Wireless LAN), Wi-Fi (Wireless Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced). However, the communication unit 430 may transmit and receive data according to at least one wireless internet technology within a range that includes even internet technologies not listed above.

According to some embodiments of the present disclosure, the device 400 may be connected to the scanning system 100, the image acquisition unit 210, the nutrient supply system 300, and/or the client device C via a wired/wireless network through the communication unit 430. Here, the term "wired/wireless network" refers to a communication network that supports various communication standards or protocols for data transmission and reception between the device 400 and other devices, between the device 400 and the image acquisition unit 210, between the device 400 and the scanning system 100, between the device 400 and the nutrient supply system 300, or between the device 400 and the client device C. Such wired/wireless networks include all currently or future supported communication networks according to standards and can support one or more communication protocols for that purpose.

The storage 420 may store data that supports various functions of the device 400. The storage 420 may store multiple application programs executed on the device 400, data for operating the device 400, instructions, and at least one program instruction. Meanwhile, the application program may be stored in the storage 420 and installed on the device 400 to be executed by the processor 410, thereby performing operations (or functions) of the device 400.

The storage 420 may store various types of information generated or determined by the processor 410 and frame data, image frame data, and any type of information received through the communication unit 430.

The storage 420 may include at least one type of storage medium such as a flash memory type, a hard disk type, a solid state disk (SSD) type, a silicon disk drive (SDD) type, a multimedia card micro type, a card-type memory (for example, SD or XD memory), RAM (random access memory), SRAM (static random access memory), ROM (read-only memory), EEPROM (electrically erasable programmable read-only memory), PROM (programmable read-only memory), magnetic memory, magnetic disk, and optical disk. The device 400 may operate in association with web storage that performs the storage function of the storage 420 on the internet.

The storage 420 may store at least one artificial intelligence model for performing various tasks according to some embodiments of the present disclosure. Specifically, the storage 420 may store a sow body data acquisition model, a target object identification model, a posture suitability determination model, a dorsal angle measurement region detection model, and a spine line validity determination model. Descriptions of each model will be provided later with reference to FIGS. 9 to 16.

The processor 410 may control overall operations of the device 400 in addition to executing operations related to the application programs. The processor 410 may process signals, data, and information input or output through the components of the device 400, or execute the application programs stored in the storage 420 to provide or process appropriate information or functions.

The processor 410 may control at least some of the components of the device 400 to execute the application programs stored in the storage 420. Furthermore, the processor 410 may operate two or more components included in the device 400 in combination to execute the application programs.

The processor 410 may be composed of one or more cores and may be any type of commercial processor. For example, the processor 410 may include a central processing unit (CPU), a general-purpose graphics processing unit (GPGPU), or a tensor processing unit (TPU). However, the present disclosure is not limited thereto.

The processor 410 of the present disclosure may be configured in a dual processor or other multi-processor architecture. However, the present disclosure is not limited thereto.

The processor 410 may read a computer program stored in the storage 420 to recognize the body condition information of a sow according to some embodiments of the present disclosure. Detailed descriptions of this will be provided below with reference to FIGS. 9 to 16.

Figure 9:
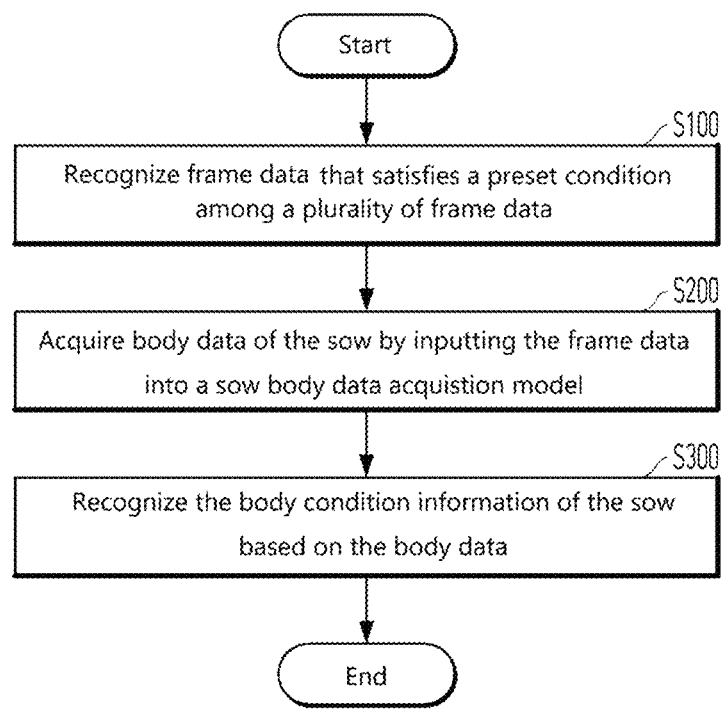
FIG. 9 is a flowchart for explaining an example of a method for recognizing body condition information of a sow according to some embodiments of the present disclosure.
Figure 10:
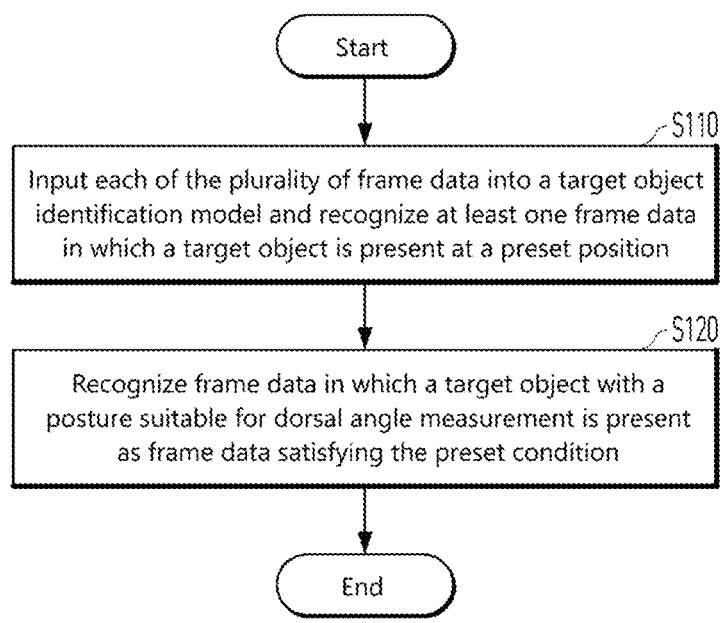
FIG. 10 is a flowchart for explaining an example of a method for recognizing preset frame data among a plurality of frame data according to some embodiments of the present disclosure.

FIG. 9 is a flowchart for explaining an example of a method for recognizing body condition information of a sow according to some embodiments of the present disclosure. FIG. 10 is a flowchart for explaining an example of a method for recognizing preset frame data among a plurality of frame data according to some embodiments of the present disclosure. Descriptions that overlap with those related to FIGS. 1 to 8 will not be repeated with respect to FIGS. 9 and 10, and the following explanation will focus on the differences.

Referring to FIG. 9, the processor 410 may recognize frame data that satisfies a preset condition among a plurality of frame data (S100).

According to some embodiments of the present disclosure, the plurality of frame data may be frame data related to each of a plurality of sows and may be acquired from the scanning device 120.

Specifically, the processor 410 may receive all of the frame data acquired by the scanning device 120 through the communication unit 430. Here, the overall frame data may refer to all of the frame data acquired by the scanning device 120. In this case, the processor 410 may also receive, through the communication unit 430, position information corresponding to the time when each piece of frame data was acquired by the scanning device 120. When the processor 410 receives the overall frame data, the processor 410 may recognize a plurality of frame data related to each of the plurality of sows based on the received position information.

For example, at least one magnetic component 116 or 117 may be located at a predefined position on the rail 110. The storage 126 of the scanning device 120 may store the position information of the at least one magnetic component (for example, a relative position from one end of the rail 110). A control module (not shown) of the scanning system 100 may control the travel distance of the wire 130 in real time based on the position of the at least one magnetic component 116 or 117, thereby moving the scanning device 120 to a desired position on the rail 110. The control module (not shown) that controls the position of the scanning device 120 in the scanning system 100 may determine the travel distance of the wire based on the number of rotations of a motor (not shown) of the drive unit or the first pulley 111. In this case, the scanning device 120 may recognize position information based on the position of the at least one magnetic component 116 or 117 and the rotation count of the motor (not shown) or the first pulley 111. The processor 410 of the device 400 may receive the overall frame data acquired by the scanning device 120 along with the position information via the communication unit 430. Then, the processor 410 may recognize a plurality of frame data related to each of the plurality of sows based on the position information received from the scanning device 120.

In another example, at least one magnetic component 116 or 117 may be located at a position corresponding to each of the plurality of spaces formed by the crate S. That is, a first magnetic component 116 may be located at a first position on the rail 110 above the space where a first sow M1 is located, and a second magnetic component 117 may be located at a second position on the rail 110 above the space where a second sow M2 is located. In this case, the scanning device 120 may detect the at least one magnetic component 116 or 117 located on the rail by using the magnetic detection sensor 121 while moving along the rail 110. Here, the position where the magnetic component is detected by the magnetic detection sensor 121 may be recognized as the position where a sow is placed. Therefore, when the scanning device 120 transmits the overall frame data to the device 400, it may also transmit information indicating whether the currently acquired frame data is related to a specific sow among the plurality of sows or unrelated to any sow. Accordingly, the processor 410 of the device 400 may recognize a plurality of frame data related to each of the plurality of sows from the overall frame data.

According to other embodiments of the present disclosure, the plurality of frame data may correspond to all of the frame data acquired by the scanning device 120. That is, the processor 410 may recognize frame data that satisfies a preset condition by using all of the frame data acquired by the scanning device 120, rather than only the frame data in which each of the plurality of sows is captured.

In the present disclosure, each of the plurality of frame data may include color information acquired through the color sensor 122 and depth information acquired through the depth sensor 123 included in the scanning device 120 at the time the frame data is acquired.

Meanwhile, the processor 410 may recognize frame data that satisfies a preset condition among the plurality of frame data. Here, the preset condition may include a first condition satisfied when a target object is present at a preset position, and a second condition satisfied when the posture of the target object is suitable for dorsal angle measurement.

Regarding the first condition, the preset position may refer to the inside of the crate, and the target object may refer to a sow. Therefore, frame data in which a sow is present inside the crate may be recognized as frame data satisfying the first condition.

For example, if the processor 410 recognizes that the frame data does not include a crate, the processor 410 may determine that the first condition is not satisfied.

In another example, if the processor 410 recognizes that the frame data includes both a crate and a sow, but the sow is located outside the crate, the processor 410 may determine that the frame data does not satisfy the first condition.

In another example, if the processor 410 recognizes that the frame data includes only the crate, the processor 410 may determine that the frame data does not satisfy the first condition.

In another example, if the processor 410 recognizes that the frame data includes both a crate and a sow, and that the sow is located inside the crate, the processor 410 may determine that the frame data satisfies the first condition.

Regarding the second condition, the target object may refer to a sow, and a state suitable for dorsal angle measurement may refer to a state in which the sow is standing with its back straight, not bent.

For example, if the processor 410 recognizes that the frame data includes a sow lying down, the processor 410 may determine that the frame data does not satisfy the second condition.

In another example, if the processor 410 recognizes that the frame data includes a sow with a bent back, the processor 410 may determine that the frame data does not satisfy the second condition.

In another example, if the processor 410 recognizes that the frame data includes a sow that is standing with its back straight, the processor 410 may determine that the frame data satisfies the second condition.

The method for recognizing frame data that satisfies the preset condition among the plurality of frame data will be described in more detail with reference to FIG. 10.

Referring to FIG. 10, the processor 410 may input each of the plurality of frame data into a target object identification model and recognize at least one frame data in which a target object is present at a preset position (S110).

In the present disclosure, each of the plurality of frame data input into the target object identification model may include color information acquired through a color sensor and depth information acquired through a depth sensor included in the scanning device when the respective frame data is acquired. The color information may be expressed in RGB values and may be configured in the form of a two-dimensional array, with each pixel in the frame data representing the color value at the corresponding point. The depth information may include a depth value corresponding to each pixel in the frame data, and this value may represent the position where the corresponding pixel is located in actual three-dimensional space.

In the present disclosure, instead of inputting frame data containing only color information into the target object identification model, frame data containing both color information and depth information is input, making it easier to distinguish between the background and the target object. Therefore, it is possible to more accurately identify the frame data in which the target object is present at the preset position among the plurality of frame data. This is because it is difficult to distinguish between the background and the target object using only color information when the target object and the background share the same color.

In the present disclosure, the target object identification model may have a deep neural network structure, which may operate by processing input data step by step through multiple layers to progressively extract more complex features. Due to this hierarchical structure, the target object identification model can effectively learn various levels of information, from low-level features (e.g., edges, colors) to high-level features (e.g., complex shapes, forms of the target object).

The target object identification model may be trained to perform a task of distinguishing between frame data in which a target object (e.g., a sow) is present at a preset location (e.g., inside the crate) and frame data in which the target object is not present at the preset location.

The target object identification model may be trained to recognize regions where a crate exists in each of the plurality of frame data and to focus on analyzing the area inside the crate. The target object identification model may first extract low-level features from training frame data and then gradually narrow down the possibility of the object being present inside the crate based on this information, while learning high-level features. Through this process, the target object identification model may be able to detect features corresponding to the presence of a target object at a preset location.

The internal structure of the target object identification model may include residual connections. Residual connections can help alleviate the vanishing gradient problem that may occur during the training of deep neural networks, thereby enabling more accurate feature extraction as the network depth increases. Through this, the target object identification model may more precisely identify frame data in which a target object exists at a preset location.

When each of the plurality of frame data is input into target object identification model, the output value from the target object identification model may be either a class value indicating that a target object exists within the preset location or a class value indicating that the target object does not exist within the preset location. Accordingly, processor 410 may input each of the plurality of frame data into target object identification model and identify at least one frame data in which the target object exists within the preset location by checking the output class values.

The processor 410 may input each of the at least one frame data identified in step S110 into a posture suitability determination model, and may recognize frame data in which a target object with a posture suitable for dorsal angle measurement is present as frame data satisfying the preset condition (S120).

In the present disclosure, each of the at least one frame data input to the posture suitability determination model may include color information acquired through a color sensor included in the scanning device and depth information acquired through a depth sensor included in the scanning device when each frame data is obtained from the scanning device. The color information may be expressed as RGB values, may be configured in the form of a two-dimensional array, and each pixel in the frame data may represent the color value at that point. The depth information may include a depth value corresponding to each pixel in the frame data, and this value may represent the position of the corresponding pixel in actual three-dimensional space.

In the present disclosure, since frame data including both color information and depth information is input to the target object identification model, rather than inputting frame data including only color information, the joint positions of the sow can be accurately identified. Accordingly, the posture estimation function for the sow can be improved, thereby enhancing the accuracy of the posture suitability determination model.

When at least one frame data is input, the posture suitability determination model can recognize whether the target object is taking a posture suitable for dorsal angle measurement. The posture suitability determination model is designed based on a deep neural network structure and can process and analyze the input data through multiple layers. Each layer can extract various features from each of the at least one frame data and evaluate the posture of the target object based on these features.

The posture suitability determination model can analyze the posture of the target object through hierarchical feature extraction. First, low-level features such as edges and color patterns are extracted, and then, based on these, high-level features such as the shape, position, posture, and orientation of the object can be extracted hierarchically. Through this step-by-step processing, the posture suitability determination model can evaluate the posture taken by the target object in at least one frame data and determine whether the posture is suitable for dorsal angle measurement.

The posture suitability determination model may include residual connections, similar to the target object identification model. Residual connections can address the vanishing gradient problem that may occur in deep neural network structures, thereby maximizing the learning efficiency of the network. Accordingly, the posture suitability determination model can utilize deeper layers to learn complex posture information and determine the posture of the target object with high accuracy under various conditions.

The posture suitability determination model may, when each of at least one frame data is input, evaluate the posture of the target object included in each frame data to identify whether it is a suitable posture for dorsal angle measurement. The output value of the posture suitability determination model may be either a class value indicating that the target object is in a posture suitable for dorsal angle measurement or a class value indicating that the target object is in a posture unsuitable for dorsal angle measurement. The processor 410 may recognize, based on the class value output from the posture suitability determination model, a frame data among the at least one frame data that satisfies a preset condition.

Referring back to FIG. 9, the processor 410 may acquire body data of the sow by inputting the frame data that satisfies the preset condition into the sow body data acquisition model (S200).

The frame data input into the sow body data acquisition model may include color information acquired through a color sensor included in the scanning device and depth information acquired through a depth sensor included in the scanning device when the frame data is acquired from the scanning device. The color information may be expressed as RGB values, may be structured in the form of a two-dimensional array, and each pixel in the frame data may represent a color value at the corresponding point. The depth information may include a depth value corresponding to each pixel in the frame data, and the value may indicate a point at which the corresponding pixel is located in actual three-dimensional space.

The body data of the sow acquired through the sow body data acquisition model may include at least one of tail position information of the sow, chest width information of the sow, rump width information of the sow, and body length information of the sow. However, the present disclosure is not limited thereto, and the body data of the sow may include more or fewer types of information than those described above.

The sow body data acquisition model may utilize various neural network architectures to comprehensively analyze frame data including color information and depth information, accurately identify the body structure of the sow, and extract necessary data, that is, the body data of the sow.

The sow body data acquisition model may be capable of multi-input processing. The sow body data acquisition model may receive both color information and depth information simultaneously as inputs and analyze them in a combined manner. This multi-input processing structure can enable three-dimensional recognition of the sow's body and provide a basis for accurately calculating the position and size of each body part. As a result, it can yield much more precise outcomes compared to simple two-dimensional image analysis.

The sow body data acquisition model has a hierarchical structure designed to extract various body features. The input frame data is processed through multiple layers, with each layer responsible for extracting and analyzing specific body features of the sow. The initial layers identify the overall shape and main contours of the sow, the intermediate layers analyze the positions and sizes of detailed body parts (e.g., tail, chest, rump), and the final layer integrates this information to ultimately generate the sow body data.

The sow body data acquisition model possesses advanced analytical capabilities utilizing depth information. The sow body data is derived three-dimensionally based on the depth information, enabling precise calculation of the actual size and position of each body part. For example, information such as the body length, chest width, and rump width of the sow is extracted based on depth data, providing accurate data that would be difficult to obtain from simple two-dimensional data.

The sow body data acquisition model, equipped with a neural network structure capable of strong learning performance, can operate reliably across diverse environments. It is designed to learn from data collected under various conditions, enabling it to perform robustly despite changes in external factors such as lighting or background. This ensures the reliable acquisition of sow body data even in varied field conditions in livestock farming.

In conclusion, the sow body data acquisition model of the present disclosure can accurately acquire body data by analyzing the sow's body structure based on frame data that includes both color information and depth information.

Meanwhile, when body data is acquired in step S200, the processor 410 may recognize body condition information of the sow based on the body data (S300).

In the present disclosure, the body condition information may include at least one of a body condition score of the sow, a backfat thickness value of the sow, and a body weight of the sow. However, the present disclosure is not limited thereto.

According to some embodiments of the present disclosure, the processor 410 may calculate the body weight of the sow based on at least one of a backfat thickness value of the sow, chest width information of the sow, rump width information of the sow, and body length information of the sow.

For example, the processor 410 may calculate the body weight of the sow using the chest width information and body length information. Specifically, the processor 410 may calculate the body weight by multiplying the square of the chest width value by the body length value. The square of the chest width emphasizes the influence of chest circumference on body weight, and since body weight is related to the overall size of the animal, multiplying the body length by the chest width enables a more accurate estimation of the total body weight.

In another example, the processor 410 may acquire the body weight by inputting the backfat thickness value, chest width information, rump width information, and body length information of the sow into a body weight estimation model. The body weight estimation model may use multiple regression analysis to estimate body weight by considering various independent variables such as chest width, backfat thickness value, rump width, and body length. The body weight estimation model may use a formula that models the relationships among various variables related to body weight.

The above examples illustrate one method of calculating body weight, and the present disclosure is not limited to these examples.

Meanwhile, according to some embodiments of the present disclosure, the processor 410 may calculate a dorsal angle value of the sow and then use it to calculate the backfat thickness value of the sow, and further calculate the body condition score of the sow using the backfat thickness value. A detailed explanation of this will be provided with reference to FIGS. 11 to 14.

Figure 11:
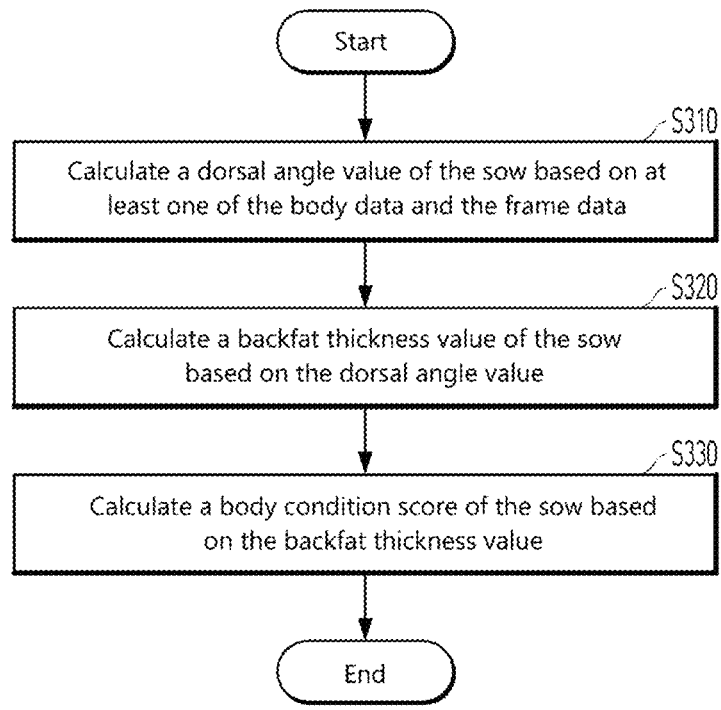
FIG. 11 is a flowchart for explaining an example of a method for calculating a body condition score of a sow by calculating a backfat thickness value of the sow according to some embodiments of the present disclosure.
Figure 12:
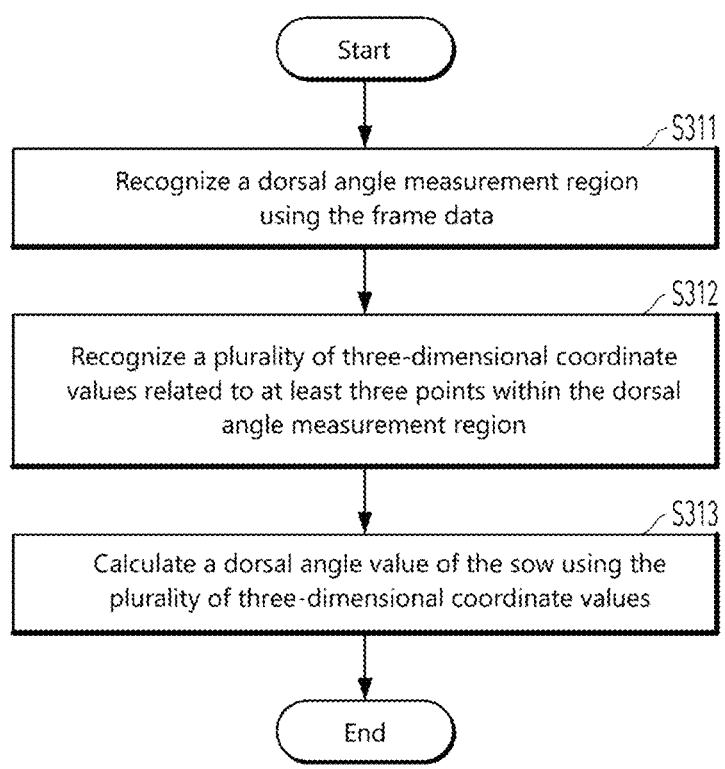
FIG. 12 is a diagram for explaining an example of a dorsal angle measurement region according to some embodiments of the present disclosure.
Figure 13:
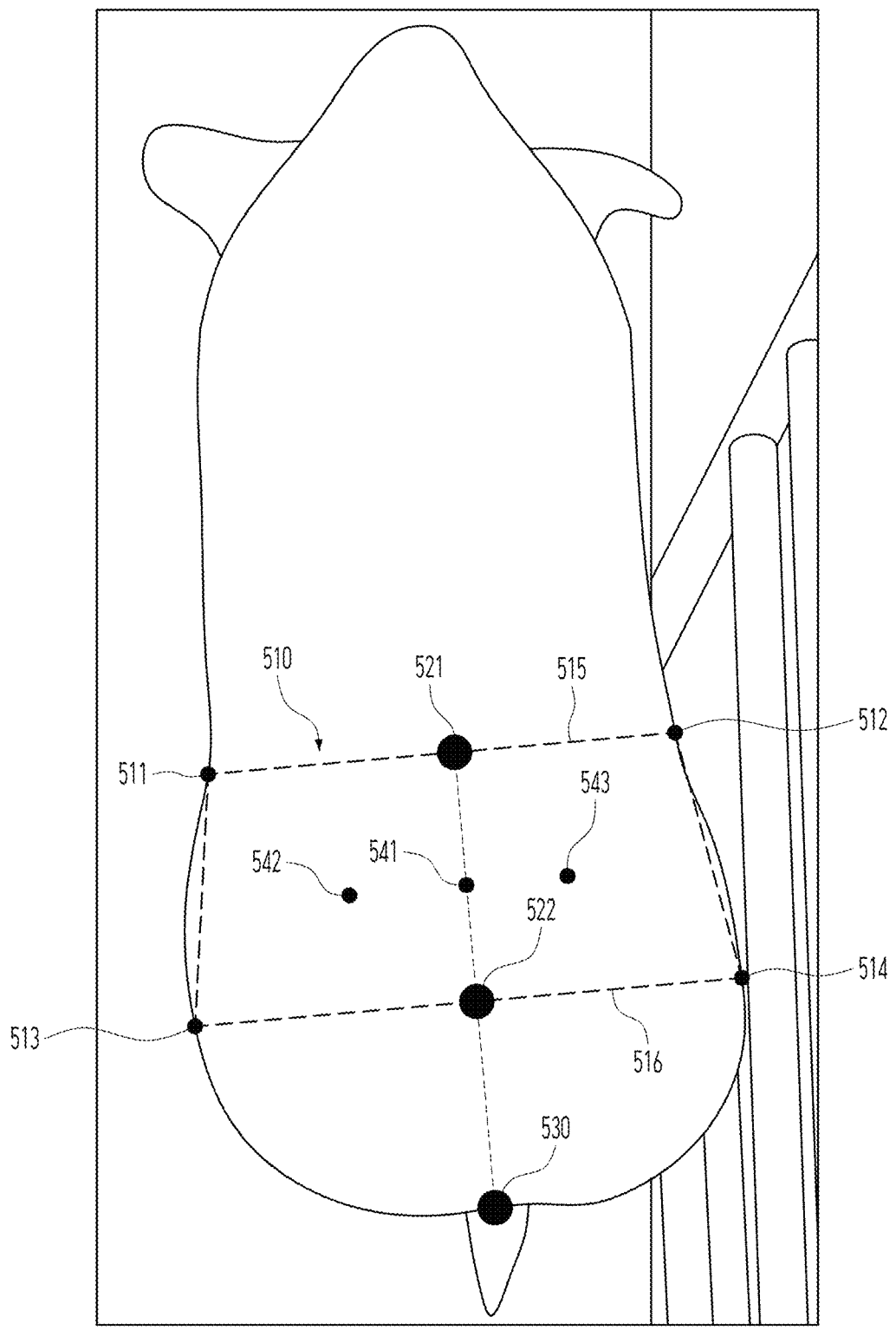
FIG. 13 is a diagram for explaining an example of a method for calculating a dorsal angle value of a sow according to some embodiments of the present disclosure.
Figure 14:
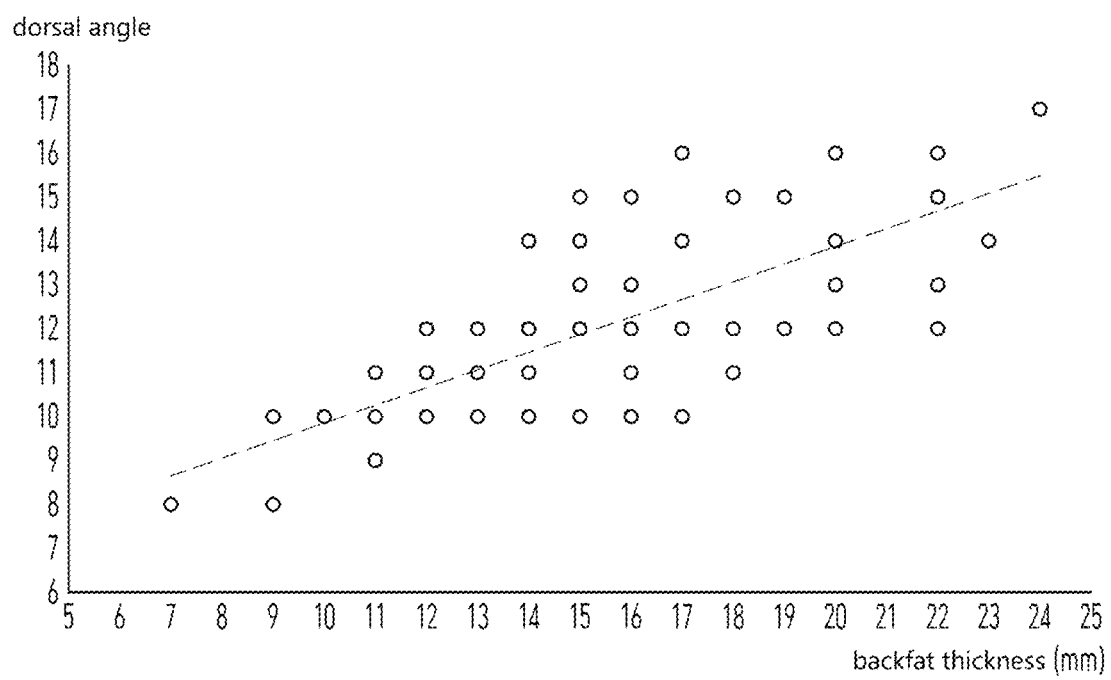
FIG. 14 is a diagram for explaining an example of a backfat thickness calculation formula for calculating a backfat value of a sow according to some embodiments of the present disclosure.

FIG. 11 is a flowchart for explaining an example of a method for calculating a body condition score of a sow by calculating a backfat thickness value of the sow according to some embodiments of the present disclosure. FIG. 12 is a diagram for explaining an example of a dorsal angle measurement region according to some embodiments of the present disclosure. FIG. 13 is a diagram for explaining an example of a method for calculating a dorsal angle value of a sow according to some embodiments of the present disclosure. FIG. 14 is a diagram for explaining an example of a backfat thickness calculation formula for calculating a backfat value of a sow according to some embodiments of the present disclosure. With respect to FIGS. 11 to 14, overlapping content already described in relation to FIGS. 1 to 10 will not be repeated, and the explanation will focus on the differences.

Referring to FIG. 11, the processor 410 may calculate a dorsal angle value of the sow based on at least one of the body data and the frame data acquired in step S200 of FIG. 9 (S310). Here, the body data may include at least one of tail position information of the sow, chest width information of the sow, rump width information of the sow, and body length information of the sow.

Specifically, referring to FIG. 12, the processor 410 may recognize a dorsal angle measurement region using the frame data (S311). Here, the dorsal angle measurement region may be defined as a region used to measure a dorsal angle within the frame data.

In the present disclosure, the dorsal angle measurement region may be a region that includes a location estimated to be where the last rib of the sow is positioned. That is, the processor 410 may recognize a region in the frame data that includes a location estimated to be where the sow's last rib is positioned.

The dorsal angle measurement region may be a region that includes a specific position relative to the body length of the sow. Here, the specific position may be a point located approximately three-fourths of the way from the head toward the tail based on the sow's body length. For example, assuming the body length of the sow is 1 meter, the specific position may be a location 75 cm away from the head. Therefore, if the body length of the sow differs, the specific position may also vary, and the dorsal angle measurement region may likewise vary.

Referring to FIG. 13, the length from the head to the tail of the sow is defined as the body length, and when the body length is considered as 100%, the dorsal angle measurement region 510 may correspond to the region from 60% to 80% along the back of the sow from the head toward the tail. For example, if the body length of the sow in the frame data is 1 cm, the dorsal angle measurement region 510 may range from the point 0.6 cm away from the head to the point 0.8 cm away from the head. However, the present disclosure is not limited thereto.

According to some embodiments of the present disclosure, the processor 410 may recognize the tail position 530 of the sow based on the body data acquired from the frame data, and may recognize the head end of the sow based on the body length information. Based on the body length information, the processor 410 may recognize a 3/5 point 521 and a 4/5 point 522 along the back of the sow from the head end. The processor 410 may then recognize the region including the 3/5 point 521 as an upper boundary line 515 and the 4/5 point 522 as a lower boundary line 516 as the dorsal angle measurement region 510.

According to other embodiments of the present disclosure, the processor 410 may input at least one of the body data acquired based on the frame data and the frame data into a dorsal angle measurement region detection model to obtain dorsal angle measurement region information as an output value. Then, the processor 410 may recognize the dorsal angle measurement region 510 based on the dorsal angle measurement region information.

The dorsal angle measurement region detection model may have a deep learning-based neural network structure and may output dorsal angle measurement region information by comprehensively analyzing the input data.

The dorsal angle measurement region detection model may include a multi-input layer that separately processes at least one of the body data and the frame data. The multi-input layer may handle each type of data through separate paths optimized for feature analysis.

The feature extraction layer of the dorsal angle measurement region detection model may be based on a convolutional neural network structure and may extract important features such as the contour of the sow, boundaries, and positions of body parts within the frame data using at least one of the frame data and body data. The feature extraction layer may extract multiple candidate dorsal angle measurement regions within the frame data.

The dorsal angle measurement region detection model may finally select a region capable of accurately measuring the dorsal angle from among the multiple candidate regions extracted by the feature extraction layer. In this process, various conditions required for a dorsal angle measurement region may be considered, and these conditions may be determined by analyzing training input data. The training input data may be image data of sows of various types and sizes, with labeled positions of dorsal angle measurement regions.

The dorsal angle measurement region information output from the dorsal angle measurement region detection model may include at least one of the coordinate values of the region within the frame data, the size of the region, and the center point of the region. Accordingly, the processor 410 may recognize the position of the dorsal angle measurement region within the frame data using the dorsal angle measurement region information. However, the present disclosure is not limited thereto.

As described above, when the dorsal angle measurement region is recognized using the dorsal angle measurement region detection model, the region can be detected with high accuracy.

Meanwhile, when the processor 410 acquires the dorsal angle measurement region information, the processor 410 may calculate a dorsal angle value based on the information.

Specifically, referring to FIG. 13, the processor 410 may recognize a dorsal angle measurement region 510 corresponding to the dorsal angle measurement region information within the frame data.

The dorsal angle measurement region 510 may include a first vertex 511, a second vertex 512, a third vertex 513, and a fourth vertex 514. A first center point 521 located at the center of an imaginary line connecting the first vertex 511 and the second vertex 512 may be positioned at a first distance from a starting point 530 of the sow's tail. A second center point 522 located at the center of an imaginary line connecting the third vertex 513 and the fourth vertex 514 may be positioned at a second distance, which is shorter than the first distance, from the starting point 530 of the sow's tail. Here, the first distance and the second distance may be determined based on the body length information of the sow. That is, if the body length information of the sow changes, the first and second distances may also vary.

Referring back to FIG. 12, when the processor 410 recognizes the dorsal angle measurement region using the frame data (S311), the processor 410 may recognize a plurality of three-dimensional coordinate values related to at least three points within the dorsal angle measurement region (S312).

Referring back to FIG. 13, the at least three points may include a first point 541 estimated to be where the spine of the sow is located, a second point 542 spaced a preset distance in a first direction (e.g., to the left) from the first point, and a third point 543 spaced the preset distance in a second direction (e.g., to the right) opposite to the first direction from the first point.

According to some embodiments of the present disclosure, the first point 541 may be a point located at the exact center of the dorsal angle measurement region 510.

According to other embodiments of the present disclosure, the first point 541 may be a point located at the center of a line that extends vertically from the starting point 530 of the sow's tail and lies within the dorsal angle measurement region 510.

According to yet another embodiment of the present disclosure, the first point 541 may be an arbitrary point located on a central line extending vertically through the dorsal angle measurement region 510.

The present disclosure is not limited to the above-described embodiments, and the position of the first point 541 may be determined in various ways.

The second point 542 and the third point 543 may refer to points spaced a preset distance from the first point 541 on a two-dimensional image. Here, the preset distance may be shorter than the width (horizontal length) and height (vertical length) of the dorsal angle measurement region 510.

In the present disclosure, the preset distance may be a distance set by the user, and the second point 542 and the third point 543 may be located at approximately 6 cm to 7 cm from the first point 541 positioned on the actual back of the sow.

Meanwhile, when the positions of the first point 541, the second point 542, and the third point 543 are determined within the frame data, the processor 410 may recognize the three-dimensional coordinate values (x, y, z coordinates) of each of the first point 541, the second point 542, and the third point 543.

Referring back to FIG. 12, when the processor 410 recognizes a plurality of three-dimensional coordinate values related to at least three points within the dorsal angle measurement region in step S312, the processor 410 may calculate a dorsal angle value of the sow using the plurality of three-dimensional coordinate values (S313). Here, the dorsal angle value of the sow may be an angle formed downward to the floor between a line connecting the first point 541 and the second point 542 and a line connecting the first point 541 and the third point 543 in three-dimensional space.

Specifically, referring back to FIG. 13, the processor 410 may calculate vectors connecting two of the first point 541, the second point 542, and the third point 543 using the three-dimensional coordinates of each point, and may calculate the dorsal angle value of the sow using the cross product and dot product of the vectors. A mathematical formula for calculating the dorsal angle value may be stored in the storage 420 of the device 400. Accordingly, when the processor 410 recognizes the three-dimensional coordinate values of the first point 541, the second point 542, and the third point 543, the processor 410 may input those values into the mathematical formula stored in the storage 420 to calculate the dorsal angle value of the sow.

Referring back to FIG. 11, when the processor 410 calculates the dorsal angle value in step S310, the processor 410 may calculate a backfat thickness value of the sow based on the dorsal angle value (S320). Specifically, the processor 410 may calculate the backfat thickness value by inputting the dorsal angle value into a backfat thickness calculation formula. Here, the backfat thickness calculation formula may be stored in the storage 420 of the device 400.

In FIG. 14, the y-axis may be an axis related to the dorsal angle value measured using a dorsal angle measurer for the sow, and the x-axis may be an axis related to the backfat thickness value measured using an ultrasound device.

The y-values of the plurality of data shown in FIG. 14 may be dorsal angle values obtained by measuring a plurality of dorsal angle measurement points of each of a plurality of external sows using a dorsal angle measurer. The x-values of the plurality of data may be backfat thickness values measured by contacting an ultrasound device to any one of the plurality of dorsal angle measurement points of each of the plurality of external sows. Here, the plurality of external sows may be sows that are the measurement targets used for modeling the backfat thickness calculation formula and may be unrelated to the automatic sow management system 1. However, the present disclosure is not limited thereto.

The backfat thickness calculation formula may be generated using the plurality of data shown in FIG. 14. Specifically, the backfat thickness calculation formula may be generated using a plurality of dorsal angle values obtained by measuring a plurality of dorsal angle measurement points of each of a plurality of external sows using a dorsal angle measurer, and a plurality of backfat thickness values measured by contacting an ultrasound device to any one of the dorsal angle measurement points of each of the plurality of external sows.

The backfat thickness calculation formula may be a mathematical formula modeled through linear regression analysis using the plurality of data, where the independent variable may be the dorsal angle value and the dependent variable may be the backfat thickness value. However, the present disclosure is not limited thereto.

The backfat thickness calculation formula may be a mathematical formula that best fits the plurality of data, and the dashed line shown in FIG. 14 may be a line related to the backfat thickness calculation formula.

Referring back to FIG. 11, when the processor 410 calculates the backfat thickness value in step S320, the processor 410 may calculate a body condition score of the sow based on the backfat thickness value (S330). Here, the body condition score may be divided on a scale from 1 to 5.

However, the present disclosure is not limited thereto, and the body condition score may be classified using various scales.

According to some embodiments of the present disclosure, the processor 410 may calculate the body condition score based on whether the backfat thickness value falls within a certain range.

For example, assuming that the body condition score is divided on a scale from 1 to 5, the processor 410 may recognize the score as 1 if the backfat thickness value is 5 mm or less, may recognize the score as 2 if the backfat thickness value is more than 5 mm and 10 mm or less, may recognize the score as 3 if the backfat thickness value is more than 10 mm and 15 mm or less, may recognize the score as 4 if the backfat thickness value is more than 15 mm and 20 mm or less, and may recognize the score as 5 if the backfat thickness value is more than 20 mm. However, the range of the backfat thickness value in the above example may be determined by the user.

Meanwhile, according to some embodiments of the present disclosure, in order to minimize the error of the backfat thickness calculation formula and improve the accuracy of the backfat thickness calculation formula, the processor 410 may perform calibration of the backfat thickness calculation formula using dorsal angle values and backfat thickness values related to each of a plurality of sows actually present in the pigpen. A detailed description of this will be provided with reference to FIG. 15.

Figure 15:
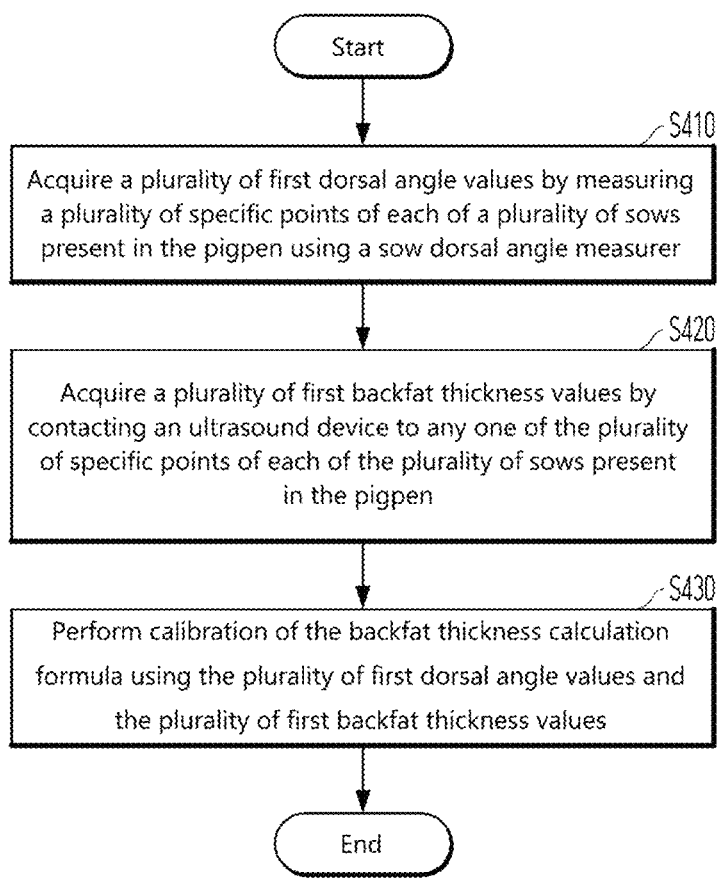
FIG. 15 is a flowchart for explaining an example of a method for performing calibration of a backfat thickness calculation formula according to some embodiments of the present disclosure.

FIG. 15 is a flowchart for explaining an example of a method for performing calibration of a backfat thickness calculation formula according to some embodiments of the present disclosure. With respect to FIG. 15, overlapping content already described in relation to FIGS. 1 to 14 will not be repeated, and the following explanation will focus on the differences.

Referring to FIG. 15, the processor 410 may acquire a plurality of first dorsal angle values by measuring a plurality of specific points of each of a plurality of sows present in the pigpen using a sow dorsal angle measurer (S410).

Specifically, the user may measure the first dorsal angle values of each of the plurality of sows present in the pigpen at a specific point in time using a sow dorsal angle measurer. The plurality of specific points for each sow may include a point spaced about 6 cm to 7 cm to the right from the midline of the last rib of each sow and a point spaced about 6 cm to 7 cm to the left from the midline of the last rib of each sow. The user may manually locate the position of the last rib, identify the plurality of specific points for each sow, and check the plurality of first dorsal angle values using the sow dorsal angle measurer. Then, the user may input the measured first dorsal angle values for each sow using a client device C. In this case, the processor 410 may receive the plurality of first dorsal angle values of each sow through the communication unit 430 and acquire the plurality of first dorsal angle values for each of the plurality of sows.

Meanwhile, the processor 410 may acquire a plurality of first backfat thickness values by contacting an ultrasound device to any one of the plurality of specific points of each of the plurality of sows present in the pigpen (S420).

Specifically, the plurality of specific points for each of the plurality of sows may include a first point spaced about 6 cm to 7 cm to the right from the midline of the last rib of each sow and a second point spaced about 6 cm to 7 cm to the left from the midline of the last rib of each sow. At a specific point in time, the user may vertically contact an ultrasound device to the first point or the second point to check the ultrasound image. In the ultrasound image, the backfat may be divided into three layers, and the thickness from the first layer to the third layer is measured. The user may input the plurality of first backfat thickness values measured for each of the plurality of sows using the ultrasound device via a client device C. In this case, the processor 410 may receive the plurality of first backfat thickness values of each sow through the communication unit 430 and acquire the plurality of first backfat thickness values.

According to some embodiments of the present disclosure, the specific point in time at which the plurality of first dorsal angle values and the plurality of first backfat thickness values of each of the plurality of sows are measured may refer to the time when each of the sows is initially placed in a respective crate in the pigpen. However, the present disclosure is not limited thereto, and the specific point in time may also refer to the time immediately before each sow begins its first farrowing or the time after each sow completes its first farrowing and the piglets begin weaning. Nonetheless, the present disclosure is not limited thereto.

Meanwhile, although FIG. 15 illustrates that step S410 is performed before step S420, the present disclosure is not limited thereto, and step S420 may be performed before step S410, or steps S410 and S420 may be performed simultaneously.

The processor 410, when acquiring the plurality of first dorsal angle values and the plurality of first backfat thickness values in steps S410 and S420, may perform calibration of the backfat thickness calculation formula stored in the storage 420 using the plurality of first dorsal angle values and the plurality of first backfat thickness values (S430).

The backfat thickness calculation formula may be generated using a plurality of dorsal angle values obtained by measuring a plurality of dorsal angle measurement points of each of a plurality of external sows using a sow dorsal angle measurer, and a plurality of backfat thickness values measured by contacting an ultrasound device to any one of the dorsal angle measurement points of each of the plurality of external sows. Here, the plurality of dorsal angle measurement points may include a plurality of points spaced a preset distance to the left and right from the midline of the last rib of each of the plurality of external sows.

For example, the backfat thickness calculation formula stored in the storage 420 may have the form y=ax+b, where x is the dorsal angle value and y is the backfat thickness value. The coefficients a and b may be values that best represent the dashed line shown in FIG. 14. Meanwhile, if the values of a and b are already determined and the processor 410 acquires the plurality of first dorsal angle values and the plurality of first backfat thickness values, the processor 410 may perform a calibration operation to revise the values of a and b using those values. To do so, the following objective function needs to be defined.

$$J(a, b) = \sum_{i=1}^{n}(y_i - (ax_i + b))^2 \quad \text{[Equation 1]}$$

In the present disclosure, it is assumed that identification numbers from 1 to n are assigned to the plurality of sows in the pigpen. In Equation 1, $x_i$ may be the dorsal angle value of the sow assigned with identification number i, acquired in step S410 of FIG. 15, and $y_i$ may be the backfat thickness value of the sow assigned with identification number i, acquired in step S420 of FIG. 15. Performing calibration of the backfat thickness calculation formula involves finding the values of a and b that minimize J(a,b) in Equation 1. That is, calibration may be performed by substituting the plurality of first dorsal angle values into $x_i$ and the plurality of first backfat thickness values into $y_i$ and correcting a and b in the direction that minimizes J(a,b).

According to some embodiments of the present disclosure, the processor 410 may acquire a plurality of second dorsal angle values by measuring a plurality of specific points of each of the plurality of sows using a sow dorsal angle measurer after a preset period has elapsed from the time of acquiring the plurality of first dorsal angle values. The processor 410 may also acquire a plurality of second backfat thickness values measured by contacting an ultrasound device to any one of the plurality of specific points of each of the plurality of sows after a preset period has elapsed from the time of acquiring the plurality of first backfat thickness values. Then, the processor 410 may further perform calibration of the backfat thickness calculation formula using the plurality of second dorsal angle values and the plurality of second backfat thickness values. Here, the preset period may be a period set by the user after the calibration of the backfat thickness calculation formula is performed in step S430. Since the process of acquiring the plurality of second dorsal angle values and the plurality of second backfat thickness values and performing calibration of the backfat thickness calculation formula using them is the same as the procedure described in steps S410, S420, and S430 of FIG. 15, a detailed description thereof will be omitted.

According to some embodiments of the present disclosure, when calibration is performed twice, the accuracy of the result value of the backfat thickness calculation formula may be significantly improved.

Meanwhile, according to some embodiments of the present disclosure, the processor 410 of the device 400 may generate a three-dimensional scan image using frame data. A detailed description thereof will be provided with reference to FIGS. 16 and 17.

Figure 16:
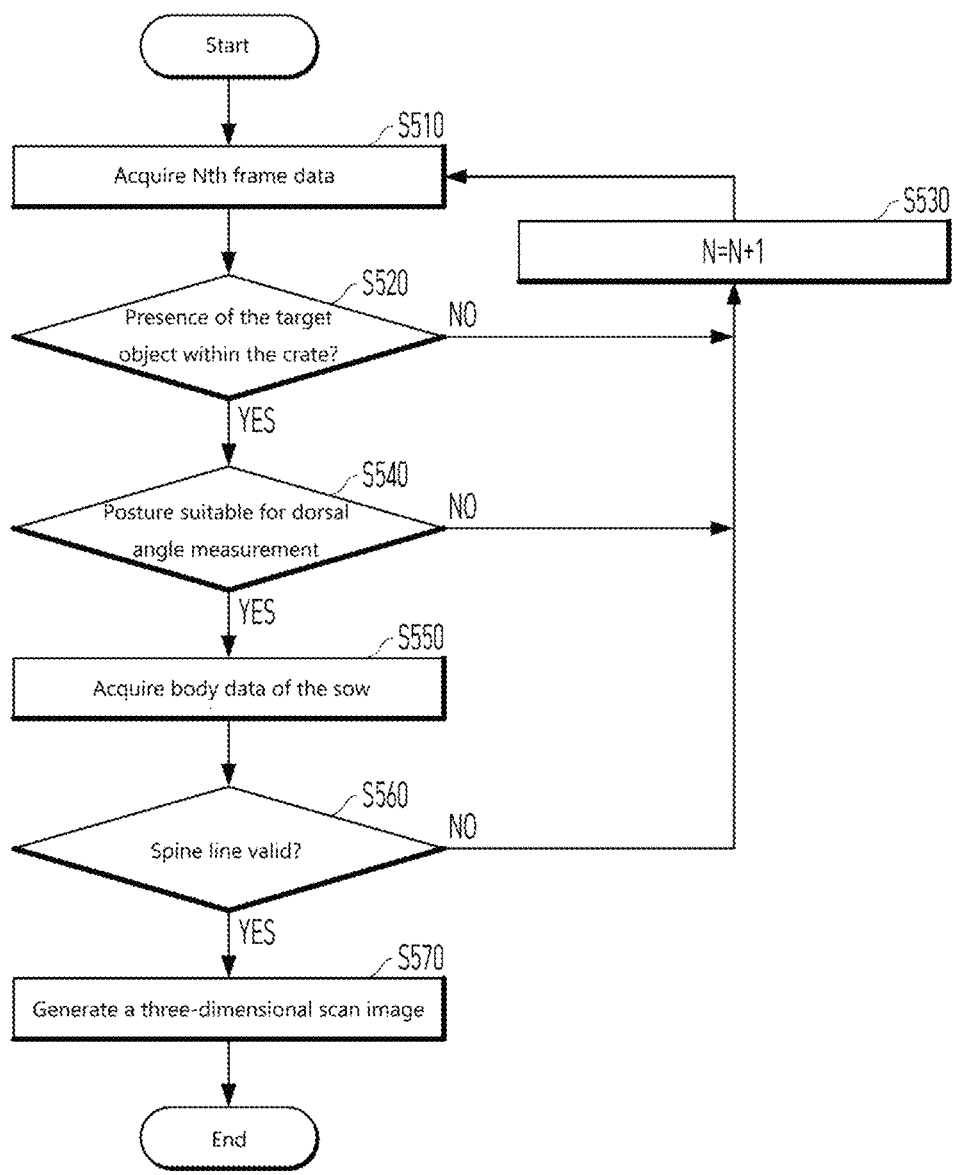
FIG. 16 is a flowchart for explaining an example of a method for generating a three-dimensional scan image according to some embodiments of the present disclosure.
Figure 17:
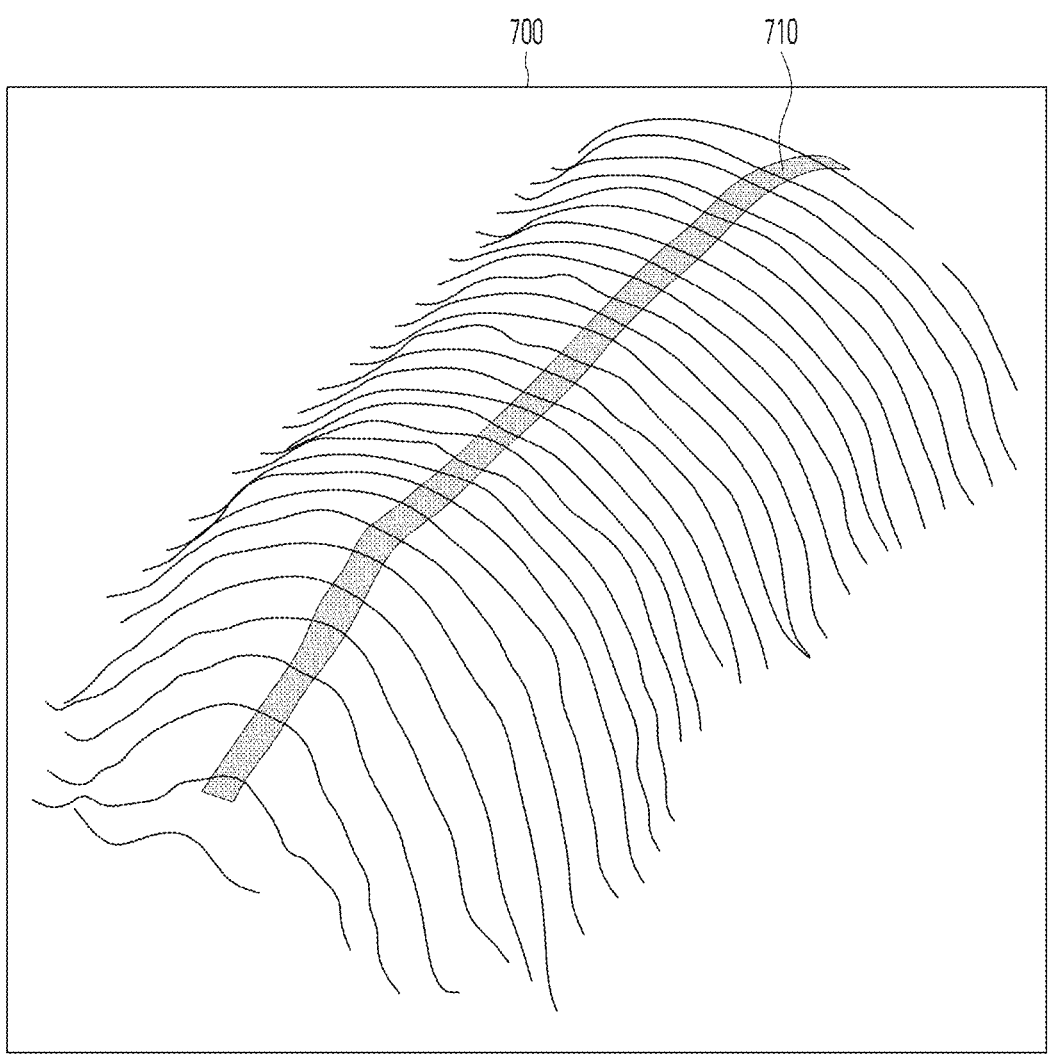
FIG. 17 is a diagram for explaining an example of a three-dimensional scan image according to some embodiments of the present disclosure.

FIG. 16 is a flowchart for explaining an example of a method for generating a three-dimensional scan image according to some embodiments of the present disclosure. FIG. 17 is a diagram for explaining an example of a three-dimensional scan image according to some embodiments of the present disclosure. With respect to FIGS. 16 and 17, overlapping content already described in relation to FIGS. 1 to 15 will not be repeated, and the following explanation will focus on the differences.

Referring to FIG. 16, the processor 410 may acquire Nth frame data (S510). Specifically, the processor 410 may receive frame data including color information and depth information, acquired over time by a color sensor 122 and a depth sensor 123 of the scanning device 120, from the scanning device 120 through the communication unit 430. Here, the frame data first acquired from the scanning device 120 may be the first frame data, and the sequence number may increase by one each time the frame data is received.

When the processor 410 acquires the Nth frame data, the processor 410 may determine whether the Nth frame data includes a crate and a target object, and whether the target object is recognized as being present within the crate (S520). If, as a result of analyzing the Nth frame data, the processor 410 determines that the target object is not present within the crate (S520, No), the processor 410 may acquire the (N+1)th frame data by incrementing the value of N by 1. Then, the processor 410 may perform the same steps (S510, S520) again.

If the processor 410 recognizes in step S520 that the target object is present in the crate (S520, Yes), the processor 410 may determine whether the Nth frame data includes a sow in a posture suitable for dorsal angle measurement (S540). If, as a result of analyzing the Nth frame data, the processor 410 determines that the sow is in an unsuitable posture for dorsal angle measurement (S540, No), the processor 410 may acquire the (N+1)th frame data by incrementing the value of N by 1. Then, the processor 410 may perform the same steps (S510, S520, S530) again.

If the processor 410 recognizes in step S540 that a sow in a posture suitable for dorsal angle measurement is included in the Nth frame data (S540, Yes), the processor 410 may acquire body data of the sow (S550).

Meanwhile, if the processor 410 has acquired the body data of the sow in step S550, the processor 410 may input the Nth frame data used to acquire the body data into a spine line validity determination model, and determine whether to generate a three-dimensional scan image based on the output data obtained.

Specifically, after acquiring the body data, the processor 410 may input the related frame data into a spine line validity determination model to determine the validity of the spine line (S560).

The spine line validity determination model may analyze frame data to determine whether the spine line of the sow included in the frame data is straight. If the spine line is recognized as straight, the spine line validity determination model may output a class value indicating that the spine line is valid, and if not, a class value indicating that it is invalid.

The spine line validity determination model may be a deep neural network-based image analysis model, specifically including multiple layers of convolutional neural networks. This model may primarily extract key features from frame data and determine which class the input data belongs to based on those features.

The spine line validity determination model may include multiple layers, each responsible for progressively learning and extracting features from low-level to high-level. The initial layers may extract low-level features such as color information, edges, and texture, while the final layers may recognize more complex shapes or structures. Ultimately, the spine line validity determination model may determine the validity of the spine line based on the features extracted from the input frame data.

The spine line validity determination model may include residual connections, similar to the posture suitability determination model and the target object identification model. Residual connections help address vanishing gradient problems in deep neural networks and maximize learning efficiency. Accordingly, the spine line validity determination model may utilize deeper layers to assess the validity of the spine line with high accuracy even under various conditions.

If the output value from the spine line validity determination model is a class value indicating that the spine line is valid (S560, Yes), the processor 410 may determine to generate a three-dimensional scan image (S570).

Meanwhile, if the output value from the spine line validity determination model is a class value indicating that the spine line is not valid (S560, No), the processor 410 may acquire the frame data with the N value increased by 1 and perform the steps shown in FIG. 16.

Referring to FIG. 17, a three-dimensional scan image 700 may be an image generated based on point cloud data acquired through a depth sensor. Here, the three-dimensional scan image 700 may show the shape of the sow in the form of contour lines. Specifically, the depth sensor included in the scanning device 120 may sense the sow while acquiring frame data and collect a plurality of three-dimensional coordinate data. The processor 410 may receive the plurality of three-dimensional coordinate data from the scanning device 120 and generate the three-dimensional scan image 700 using the plurality of three-dimensional coordinate data.

The three-dimensional scan image 700 may include spine position information 710 of the sow generated based on body data. Specifically, the processor 410 may recognize the spine position of the sow in the three-dimensional scan image 700 based on the tail position information, chest width information, rump width information, and body length information included in the body data, and may display the spine position information 710 of the sow in the three-dimensional scan image 700.

According to some embodiments of the present disclosure, the processor 410 may estimate the endpoint of the spine based on the tail position information of the sow. However, the present disclosure is not limited thereto.

According to some embodiments of the present disclosure, the processor 410 may recognize the width of the chest part of the sow based on the chest width information and recognize the curvature and shape of the spine. However, the present disclosure is not limited thereto.

According to some embodiments of the present disclosure, the processor 410 may predict the shape of the rear spine of the sow based on the rump width information. However, the present disclosure is not limited thereto.

According to some embodiments of the present disclosure, the processor 410 may determine the overall length and shape of the spine based on the body length information of the sow. However, the present disclosure is not limited thereto.

If the device 400 continuously generates three-dimensional scan images upon receiving a plurality of frame data from the scanning device 120, the processor 410 may cause an issue where the processing load of the processor 410 of the device 400 increases, thereby reducing data processing speed and storage capacity. According to some embodiments of the present disclosure, the three-dimensional scan image is generated only when specific conditions are satisfied, which can improve data processing speed and efficiently use storage space.

According to at least one of the above-described embodiments of the present disclosure, body condition information of a sow can be recognized in a non-contact manner, thereby minimizing stress on the sow, improving the quality of colostrum, and reducing the rates of stillbirth and dystocia.

In the present disclosure, the device 400 is not limited to applying the configurations and methods of the above-described embodiments in a restrictive manner. Rather, all or some of the described embodiments may be selectively combined in various ways to achieve different modifications.

Various embodiments described in the present disclosure may be implemented using software, hardware, or a combination thereof in a computer-readable recording medium in or associated with a computer or a similar device.

In terms of hardware implementation, some embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing specific functions. In some cases, certain embodiments of the present disclosure may be implemented by a processor.

In terms of software implementation, some embodiments such as the procedures and functions described herein may be implemented as separate software modules. Each software module may perform one or more functions, tasks, or operations described in the present disclosure. Software code may be implemented as a software application written in a suitable programming language. Here, the software code may be stored in the storage 420 and executed by the processor 410. That is, at least one program instruction may be stored in the storage 420 and executed by the processor 410.

A method for recognizing the backfat thickness of a sow by the processor of the device according to some embodiments of the present disclosure may be implemented as code readable by the processor on a computer-readable recording medium provided in the device. The computer-readable recording medium includes all types of recording devices in which data that can be read by the processor is stored. Examples of such media include ROM (Read Only Memory), RAM (Random Access Memory), CD-ROM, magnetic tape, floppy disk, and optical data storage devices.

While the present disclosure has been described with reference to the accompanying drawings, this is only one example and is not limited to specific embodiments. Various modifications that can be made by those skilled in the art fall within the scope of the claims. Furthermore, such modifications should not be interpreted separately from the technical spirit of the present invention.

What is claimed is:

1. A method for calculating a backfat thickness of a sow by a processor of a device, the method comprising:
   recognizing a dorsal angle measurement region using frame data;
   recognizing a plurality of three-dimensional coordinate values related to at least three points within the dorsal angle measurement region; and
   calculating a dorsal angle value of the sow for calculating the backfat thickness of the sow using the plurality of three-dimensional coordinate values;
   wherein the recognizing the dorsal angle measurement region using the frame data comprises:
   inputting at least one of the frame data and body data acquired based on the frame data into a dorsal angle measurement region detection model, wherein the dorsal angle measurement region detection model is pre-trained to select a region having the highest accuracy for dorsal angle measurement among a plurality of candidate dorsal angle measurement regions; and
   recognizing the dorsal angle measurement region based on dorsal angle measurement region information output from the dorsal angle measurement region detection model.

2. The method of claim 1, wherein the frame data comprises:
   color information acquired through a color sensor included in a scanning device; and
   depth information acquired through a depth sensor included in the scanning device.

3. The method of claim 1, wherein the dorsal angle measurement region comprises a first vertex, a second vertex, a third vertex, and a fourth vertex;
   wherein a first center point located at a center of an imaginary line connecting the first vertex and the second vertex is located at a position spaced a first distance from a starting point of a tail of the sow; and
   wherein a second center point located at a center of an imaginary line connecting the third vertex and the fourth vertex is located at a position spaced a second distance, which is shorter than the first distance, from the starting point of the tail of the sow.

4. The method of claim 1, wherein the dorsal angle measurement region comprises a position where a last rib of the sow is estimated to be located.

5. The method of claim 2, wherein the at least three points comprise:
- a first point estimated to be where a spine of the sow is located;
- a second point spaced a preset distance in a first direction from the first point; and
- a third point spaced the preset distance in a second direction opposite to the first direction from the first point.

6. The method of claim 5, wherein the recognizing the plurality of three-dimensional coordinate values related to at least three points within the dorsal angle measurement region comprises:
- recognizing an arbitrary point located on a central line within the dorsal angle measurement region as the first point;
- recognizing the second point spaced the preset distance from the first point in the first direction, and the third point spaced the preset distance from the first point in a second direction opposite to the first direction; and
- recognizing the three-dimensional coordinate values related to the first point, the second point, and the third point as the plurality of three-dimensional coordinate values.

7. The method of claim 6, wherein the preset distance is shorter than a vertical length and a horizontal length of the dorsal angle measurement region.

8. The method of claim 3, wherein the body data comprises at least one of tail position information of the sow, chest width information of the sow, rump width information of the sow, or body length information of the sow.

9. The method of claim 8, wherein the first distance and the second distance are determined based on the body length information of the sow.

10. The method of claim 1, further comprising calculating the backfat thickness value by inputting the dorsal angle value into a backfat thickness calculation formula,
- wherein the backfat thickness calculation formula is generated using a plurality of dorsal angle values obtained by measuring a plurality of dorsal angle measurement points of each of a plurality of external sows using a dorsal angle measurer, and a plurality of backfat thickness values measured by contacting an ultrasound device to any one of the plurality of dorsal angle measurement points of each of the plurality of external sows.

11. The method of claim 1, wherein the body data is acquired by inputting the frame data into a body data acquisition model for the sow.

12. The method of claim 10, further comprising:
- determining a body condition score of the sow using the backfat thickness value when the backfat thickness value is calculated.

13. A device for calculating a backfat thickness of a sow, the device comprising:
- a storage configured to store at least one program instruction; and
- a processor configured to execute the at least one program instruction,
- wherein the processor performs steps for calculating the backfat thickness of the sow, the steps comprising:
- recognizing a dorsal angle measurement region using frame data;
- recognizing a plurality of three-dimensional coordinate values related to at least three points within the dorsal angle measurement region; and
- calculating a dorsal angle value of the sow for calculating the backfat thickness of the sow using the plurality of three-dimensional coordinate values;
- wherein the step of recognizing the dorsal angle measurement region using the frame data comprises:
- inputting at least one of the frame data or body data acquired based on the frame data into a dorsal angle measurement region detection model, wherein the dorsal angle measurement region detection model is pre-trained to select a region having the highest accuracy for dorsal angle measurement among a plurality of candidate dorsal angle measurement regions; and
- recognizing the dorsal angle measurement region based on dorsal angle measurement region information output from the dorsal angle measurement region detection model.

* * * * *